United States Patent
Xue et al.

(10) Patent No.: US 12,543,206 B2
(45) Date of Patent: Feb. 3, 2026

(54) DATA TRANSMISSION METHOD AND APPARATUS

(71) Applicant: Huawei Technologies Co., Ltd., Shenzhen (CN)

(72) Inventors: Yifan Xue, Shenzhen (CN); Lixia Xue, Beijing (CN); Haibo Xu, Beijing (CN); Mengchen Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 254 days.

(21) Appl. No.: 18/002,201

(22) PCT Filed: Jun. 15, 2021

(86) PCT No.: PCT/CN2021/100155
§ 371 (c)(1),
(2) Date: Dec. 16, 2022

(87) PCT Pub. No.: WO2021/254339
PCT Pub. Date: Dec. 23, 2021

(65) Prior Publication Data
US 2023/0345517 A1    Oct. 26, 2023

(30) Foreign Application Priority Data

Jun. 20, 2020   (CN) .................. 202010569721.X
Aug. 20, 2020   (CN) .................. 202010845774.X

(51) Int. Cl.
*H04W 72/54*   (2023.01)
*H04B 17/309*   (2015.01)
(Continued)

(52) U.S. Cl.
CPC .......... *H04W 72/54* (2023.01); *H04B 17/309* (2015.01); *H04W 56/0015* (2013.01);
(Continued)

(58) Field of Classification Search
CPC ............. H04W 72/54; H04W 72/1268; H04W 74/0833; H04W 56/0015; H04B 17/309
See application file for complete search history.

(56) References Cited

U.S. PATENT DOCUMENTS

| 2018/0110074 A1 | 4/2018 | Akkarakaran et al. |
| 2019/0174571 A1 * | 6/2019 | Deenoo .................. H04W 68/02 |

(Continued)

FOREIGN PATENT DOCUMENTS

| CA | 3038595 A1 * | 9/2019 | ............ H01M 10/48 |
| CA | 3096830 A1 * | 9/2020 | ........... H04L 1/0003 |

(Continued)

OTHER PUBLICATIONS

Samsung, 3GPP TSG-RAN WG2 Meeting #6 Reno, USA, Nov. 14-18, 2016, R2-168051, "Overall procedure for data transfer in inactive state." 6 pages.

(Continued)

*Primary Examiner* — Saad A. Waqas
(74) *Attorney, Agent, or Firm* — Conley Rose, P.C.

(57) ABSTRACT

A method implemented by a terminal, wherein the method comprises obtaining a channel quality of a channel between the terminal and an access network device, wherein the terminal is in a non-connected state, and determining to send uplink data to the access network device in a random access manner or a configured grant (CG) manner when the channel quality is greater than a first threshold, and wherein determining to send the uplink data to the access network device in the random access manner comprises determining to send the uplink data to the access network device in a 2-step random access manner when the channel quality is greater than a second threshold, and determining to send the uplink (Continued)

data to the access network device in a 4-step random access manner when the channel quality is less than the second threshold.

19 Claims, 13 Drawing Sheets

(51) Int. Cl.
*H04W 56/00* (2009.01)
*H04W 72/1268* (2023.01)
*H04W 74/0833* (2024.01)
*H04W 74/0836* (2024.01)

(52) U.S. Cl.
CPC ... *H04W 72/1268* (2013.01); *H04W 74/0833* (2013.01); *H04W 74/0836* (2024.01)

(56) References Cited

U.S. PATENT DOCUMENTS

| | | | |
|---|---|---|---|
| 2020/0008244 A1 | 1/2020 | Suzuki et al. | |
| 2020/0329505 A1 | 10/2020 | Shan et al. | |
| 2022/0078739 A1* | 3/2022 | Zhang | H04W 56/0045 |

FOREIGN PATENT DOCUMENTS

| | | | | |
|---|---|---|---|---|
| CN | 102244932 A | 11/2011 | | |
| CN | 109716856 A | 5/2019 | | |
| CN | 110192426 A | 8/2019 | | |
| EP | 3934346 A1 | 1/2022 | | |
| EP | 4024971 A1 * | 7/2022 | ......... | H04B 7/18513 |
| EP | 4132192 A1 * | 2/2023 | ........... | H04L 1/0003 |
| JP | 2019532588 A | 11/2019 | | |
| WO | 2019090646 A1 | 5/2019 | | |
| WO | WO-2020026154 A1 * | 2/2020 | ........... | H04B 17/318 |

OTHER PUBLICATIONS

Qualcomm Incorporated, 3GPP TSG-RAN WG2 Meeting #111e, Online, Aug. 17-28, 2020, R2-2007540, "RACH based NR small data transmission," 5 pages.

TCL Communications Ltd, 3GPP TSG-RAN WG2 #113bis-e. Electronic meeting, Apr. 12-20, 2021, R2-2104263. "Discussion on Small Data Transmission," 4 pages.

ZTE Corporation, 3GPP TSG RAN Meeting #86, Sitges, Spain, Dec. 9-12, 2019, RP-193252, "Work Item on NR smalldata transmissions in INACTIVE state," 4 pages.

* cited by examiner

DATA TRANSMISSION METHOD AND APPARATUS

CROSS-REFERENCE TO RELATED APPLICATIONS

This is a U.S. National Stage of International Patent Application No. PCT/CN2021/100155 filed on Jun. 15, 2021, which claims priority to Chinese Patent Application No. 202010569721.X filed on Jun. 20, 2020 and Chinese Patent Application No. 202010845774.X filed on Aug. 20, 2020. All of the aforementioned patent applications are hereby incorporated by reference in their entireties.

TECHNICAL FIELD

Embodiments of this application relate to the field of communication technologies, and in particular, to a data transmission method and an apparatus.

BACKGROUND

Currently, when a terminal is in an idle (idle) state or an inactive (inactive) state, if the terminal needs to transmit uplink data to an access network device, the terminal needs to initiate random access, for example, a 4-step random access process or a 2-step random access process, and transmit the uplink data to the access network device after switching from the idle/inactive state to a connected (connected) state. If the uplink data is small data and has a small data volume, a complete random access process also needs to be initiated for transmitting a small volume of data. This increases signaling overheads and power consumption of the terminal.

To reduce signaling overheads and power consumption of the terminal, the terminal may transmit the uplink data to the access network device in a random access process, or transmit the uplink data by using an uplink resource (for example, a configured grant (configured grand, CG)) pre-configured by the access network device for the terminal. When the uplink data is transmitted in the random access process or by using the CG, to ensure that the uplink data can be successfully transmitted to the access network device in the random access process or by using the CG, a channel with higher channel quality is selected to transmit the uplink data. Therefore, to successfully transmit the uplink data in the random access process or by using the CG, how to select the channel with higher channel quality is a technical problem that urgently needs to be resolved.

SUMMARY

Embodiments of this application provide a data transmission method and an apparatus, so that when a terminal is in a non-connected state, the terminal sends uplink data in a 2-step random access manner, a 4-step random access manner, or a CG manner.

To achieve the foregoing objectives, the following technical solutions are used in embodiments of this application.

According to a first aspect, a data transmission method is provided. The method includes: A terminal in a non-connected state obtains quality of a channel between the terminal and an access network device; and when the channel quality is greater than a first threshold, the terminal determines to send uplink data to the access network device in a random access manner or a CG manner, where the random access manner includes a 2-step random access manner or a 4-step random access manner. That the terminal determines to send uplink data to the access network device in a random access manner includes: When channel quality is greater than a second threshold, the terminal determines to send the uplink data to the access network device in the 2-step random access manner; or when channel quality is less than a second threshold, the terminal determines to send the uplink data to the access network device in the 4-step random access manner.

According to the method in the first aspect, the first threshold and the second threshold may be configured for the terminal, the first threshold is used by the terminal to determine whether to select to send the uplink data in the random access manner or the CG manner, and the second threshold is used by the terminal to select to send the uplink data in the 2-step random access manner or the 4-step random access manner, so that the terminal can properly select, based on the first threshold and the second threshold, a manner for sending the uplink data. This improves uplink data transmission efficiency and avoids a problem that uplink data transmission fails and a resource waste is caused because channel quality corresponding to the selected transmission manner is poor.

In a possible design, the method further includes: When the channel quality is less than the first threshold and the channel quality is greater than a fifth threshold, the terminal determines not to send the uplink data to the access network device in the non-connected state, but to access the cell in the 2-step random access manner; and when the channel quality is less than the first threshold and the channel quality is less than the fifth threshold, the terminal determines not to send the uplink data to the access network device in the unconnected state, but to access the cell in the 4-step random access manner.

Based on the possible design, when the channel quality is less than the first threshold, the uplink data may not be sent in the 2-step random access manner or the 4-step random access manner, but only random access is initiated. That is, when the channel quality is unsatisfactory, the uplink data is not sent in the random access manner. This prevents uplink data transmission failures.

According to a second aspect, a data transmission method is provided. The method includes: A terminal in a non-connected state obtains quality of a channel between the terminal and an access network device; when the channel quality is greater than a sixth threshold and the channel quality is greater than a seventh threshold, the terminal determines to send uplink data to the access network device in a 2-step random access manner; and when channel quality is less than the sixth threshold and channel quality is greater than an eighth threshold, the terminal determines to send the uplink data to the access network device in a 4-step random access manner.

According to the method in the second aspect, the sixth threshold, the seventh threshold, and the eighth threshold may be configured for the terminal. The sixth threshold is used by the terminal to select to use a 2-step random access resource or a 4-step random access resource, and the seventh threshold is used by the terminal to select the 2-step random access resource to send the uplink data or random access. The eighth threshold is used by the terminal to select the 4-step random access resource to send the uplink data or initiate random access, so that the terminal can properly select, based on the sixth threshold, the seventh threshold, and the eighth threshold, a manner for sending the uplink data. This improves uplink data transmission efficiency and avoids a problem that uplink data transmission fails and a resource waste is caused because channel quality corresponding to the selected transmission manner is poor.

In a possible design, the method further includes: When the channel quality is greater than the sixth threshold and the channel quality is less than the seventh threshold, the terminal determines not to send the uplink data to the access network device in the non-connected state, but to access a cell in the 2-step random access manner; or when the channel quality is less than a sixth threshold and the channel quality is less than the eighth threshold, the terminal determines not to send the uplink data to the access network device in the unconnected state, but to access a cell in the 4-step random access manner.

Based on the possible design, when the channel quality is less than the seventh threshold, the uplink data may not be sent in the 2-step random access manner, but only 2-step random access may be initiated. When the channel quality is less than the eighth threshold, the uplink data may not be sent in the 4-step random access manner, but only 4-step random access is initiated. That is, when the channel quality is unsatisfactory, the uplink data is not sent in the random access manner. This prevents uplink data transmission failures.

With reference to the first aspect or the second aspect, in a possible design, the terminal determines whether a TA used for uplink time synchronization between the terminal and the access network device is valid. When the TA is invalid, the terminal determines to send the uplink data to the access network device in the random access manner. When the TA is valid, the terminal determines to send the uplink data to the access network device in the CG manner. A CG resource corresponding to the CG manner is a PUSCH resource that is preconfigured by the access network device and that is used by the terminal in the non-connected state.

Based on this possible design, when the terminal supports a CG, the CG manner may be preferentially selected. The uplink data is sent in the preconfigured PUSCH resource without a random access process. This reduces power consumption of the terminal and saves random access resources.

In a possible design, after the terminal determines to send the uplink data to the access network device in the 2-step random access manner, the method further includes: When the channel quality is greater than a third threshold, the terminal sends the uplink data to the access network device on MsgA based on a first transmission resource corresponding to the 2-step random access manner.

Based on this possible design, when the 2-step random access manner corresponds to a large quantity of transmission resources, when the channel quality is greater than the third threshold, the first transmission resource may be selected by the terminal to send the uplink data. This avoids a problem that uplink data transmission fails and a resource waste is caused because the selected transmission resource is poor.

In a possible design, configuration information corresponding to the first transmission resource includes a third threshold; or the third threshold is included in at least one threshold, each of the at least one threshold corresponds to one transmission parameter threshold, and a transmission parameter of the first transmission resource is greater than a transmission parameter threshold corresponding to the third threshold; or the third threshold is included in at least one threshold, each of the at least one threshold corresponds to one transmission parameter range, and a transmission parameter of the first transmission resource belongs to a transmission parameter range corresponding to the third threshold. Based on this possible design, a threshold used by the terminal to select a proper transmission resource may be set in configuration information of the transmission resource, or a threshold used by the terminal to select a proper transmission resource and a transmission parameter threshold are correspondingly set, or a threshold used by the terminal to select a proper transmission parameter and a transmission parameter range are correspondingly set. Configuration manners are flexible and highly adaptable.

In a possible design, the transmission parameter includes one or more of an MCS and a TBS. In other words, a transmission requirement of a transmission resource is measured based on the MCS and/or the TBS. Transmission parameter designs are diversified and highly flexible.

In a possible design, after the terminal determines to send the uplink data to the access network device in the CG manner, the method further includes: When the channel quality is greater than a fourth threshold, the terminal sends the uplink data to the access network device based on a first CG resource. Based on this possible design, when the CG manner corresponds to a large quantity of transmission resources, when the channel quality is greater than the fourth threshold, the first CG resource may be selected by the terminal to send the uplink data. This avoids a problem that uplink data transmission fails and a resource waste is caused because the selected CG resource is poor.

In a possible design, configuration information corresponding to the first CG resource includes the fourth threshold; or the fourth threshold is included in at least one threshold, each of the at least one threshold corresponds to one transmission parameter threshold, and a transmission parameter of the first CG resource is greater than a transmission parameter threshold corresponding to the fourth threshold; or the fourth threshold is included in at least one threshold, each of the at least one threshold corresponds to one transmission parameter range, and a transmission parameter of the first CG resource belongs to a transmission parameter range corresponding to the fourth threshold. Based on this possible design, a threshold used by the terminal to select a proper CG resource may be set in configuration information corresponding to the CG resource, or a threshold used by the terminal to select a proper CG resource and a transmission parameter threshold are correspondingly set, or a threshold used by the terminal to select a proper transmission parameter and a transmission parameter range are correspondingly set. Configuration manners are flexible and highly adaptable.

In a possible design, the TA being invalid includes one or more of the following: a validity period of the TA expires; a distance between a current location of the terminal and a location at which the terminal is located when the TA is started is greater than a distance threshold; and a difference between the channel quality and quality of the channel between the terminal and the access network device achieved when the TA is started is greater than a channel quality change threshold. Based on this possible design, whether the TA of the terminal is invalid may be determined based on whether the TA expires, whether the terminal moves, or the like. Determining manners are flexible and diversified, and application scenarios are expanded.

In a possible design, the first threshold, the second threshold, the third threshold, the fourth threshold, the fifth threshold, the sixth threshold, the seventh threshold, and the eighth threshold are configured by the access network device for the terminal, and the access network device uniformly configures and manages thresholds used by the terminal to select a proper manner or transmission resource to send the uplink data. Centralized management and unified standards simplify a system design.

According to a third aspect, this application provides a communication apparatus. The communication apparatus may be the foregoing terminal or a chip or a system-on-a-chip in the terminal, or may be a function module that is in the terminal and that is configured to implement the method according to the first aspect or any possible design of the first aspect or the second aspect or any possible design of the second aspect. The terminal may implement functions performed by the terminal in the foregoing aspect or the possible designs, and the functions may be implemented by hardware executing corresponding software. The hardware or the software includes one or more modules corresponding to the functions. For example, the terminal may include a receiving unit and a processing unit.

In a possible design, the receiving unit is configured to obtain quality of a channel between the terminal and an access network device. The processing unit is configured to: when the channel quality is greater than a first threshold, determine to send uplink data to the access network device in a random access manner or a CG manner, where the random access manner includes a 2-step random access manner or a 4-step random access manner; for example, when the channel quality is greater than a second threshold, determine to send the uplink data to the access network device in the 2-step random access manner; or when the channel quality is less than a second threshold, determine to send the uplink data to the access network device in the 4-step random access manner.

In another possible design, the receiving unit is configured to obtain quality of a channel between the terminal and an access network device. The processing unit is configured to: when the channel quality is greater than a sixth threshold and the channel quality is greater than a seventh threshold, determine to send uplink data to the access network device in a 2-step random access manner; or when the channel quality is less than a sixth threshold and the channel quality is greater than an eighth threshold, determine to send uplink data to the access network device in a 4-step random access manner.

Specifically, for related execution actions of the processing unit and the receiving unit, refer to the first aspect or any possible design of the first aspect or the second aspect or any possible design of the second aspect. Details are not described again.

According to a fourth aspect, a communication apparatus is provided. The communication apparatus may be a terminal, or a chip or a system-on-a-chip in the terminal. The terminal may implement functions performed by the terminal in the foregoing aspect or the possible designs; and the functions may be implemented by hardware. In a possible design, the terminal may include a processor and a communication interface. In an example, the processor may be configured to support the terminal in implementing the function according to the first aspect or any possible design of the first aspect. For example, the processor is configured to obtain quality of a channel between the terminal and an access network device. When the channel quality is greater than a first threshold, the terminal determines to send uplink data to the access network device in a random access manner or a CG manner. For example, when the channel quality is greater than a second threshold, the terminal determines to send the uplink data to the access network device in a 2-step random access manner. Alternatively, when the channel quality is less than a second threshold, the terminal determines to send the uplink data to the access network device in a 4-step random access manner. In another example, the processor is configured to: obtain quality of a channel between the terminal and an access network device; when the channel quality is greater than a sixth threshold and the channel quality is greater than a seventh threshold, determine to send uplink data to the access network device in a 2-step random access manner; or when the channel quality is less than a sixth threshold and the channel quality is greater than an eighth threshold, determine to send uplink data to the access network device in a 4-step random access manner. In another possible design, the communication apparatus may further include a memory. The memory is configured to store computer-executable instructions and data that are necessary for the terminal. When the communication apparatus runs, the processor executes the computer-executable instructions stored in the memory, so that the communication apparatus performs the data transmission method according to the first aspect or any possible design of the first aspect or the second aspect or any possible design of the second aspect.

According to a fifth aspect, a computer-readable storage medium is provided. The computer-readable storage medium may be a readable non-volatile storage medium. The computer-readable storage medium stores instructions. When the instructions are run on a computer, the computer is enabled to perform the data transmission method according to the first aspect or any possible design of the first aspect or the second aspect or any possible design of the second aspect.

According to a sixth aspect, a computer program product including instructions is provided. When the computer program product runs on a computer, the computer is enabled to perform the data transmission method according to the first aspect or any possible design of the first aspect or the second aspect or any possible design of the second aspect.

According to a seventh aspect, a communication apparatus is provided. The communication apparatus may be a terminal or a chip or a system-on-a-chip in a terminal. The terminal includes one or more processors and one or more memories. The one or more memories are coupled to the one or more processors, the one or more memories are configured to store computer program code, and the computer program code includes computer instructions. When the one or more processors execute the computer instructions, the terminal is enabled to perform the data transmission method according to the first aspect or any possible design of the first aspect or the second aspect or any possible design of the second aspect.

For technical effects brought by any design manner of the fourth aspect to the seventh aspect, refer to technical effects brought by the first aspect or any possible design of the first aspect or the second aspect or any possible design of the second aspect. Details are not described again.

According to an eighth aspect, an embodiment of this application provides a communication system. The communication system may include an access network device and a terminal. The terminal includes the communication apparatus, the computer program product, or the readable storage medium according to any one of the third aspect to the seventh aspect.

DESCRIPTION OF EMBODIMENTS

Figure 1A:
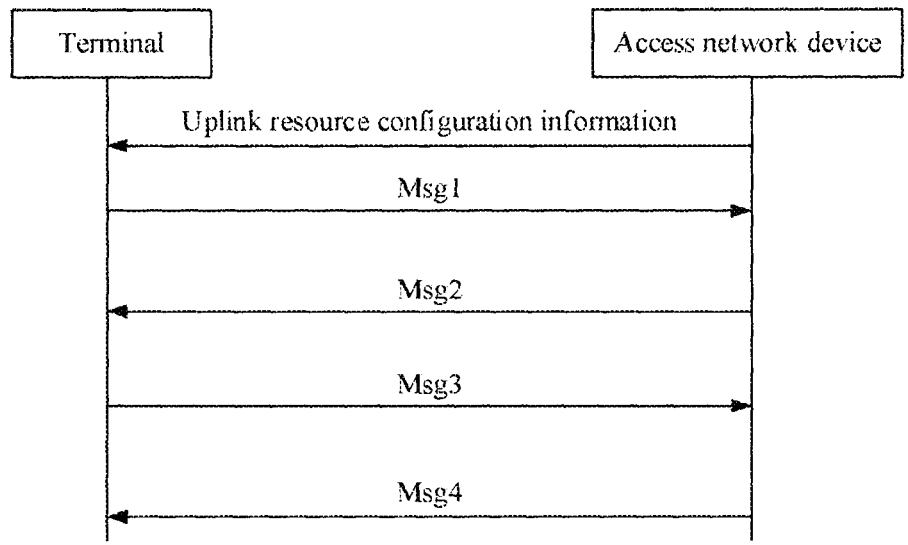
FIG. 1a is a schematic diagram of a 4-step random access manner.

Before embodiments of this application are described, some terms in embodiments of this application are explained.

A connected (connected) state may be referred to as a radio resource control connected (radio resource control connected, RRC-connected) state. In the connected state, a terminal is connected to a network device (for example, an access network device), and data is transmitted between the terminal and the network device. For example, the terminal may receive downlink data from the network device or send uplink data to the network device.

An idle (idle) state may be referred to as a radio resource control idle (radio resource control idle, RRC-idle) state. In the idle state, a terminal is not connected to an access network device (for example, an access network device), and the access network device does not know whether the terminal is within a coverage area of the access network device. The terminal may receive one or more of a paging (paging) message, a synchronization signal, a broadcast message, or system information from the access network device, but cannot perform data transmission such as a voice call or Internet access with a large volume of data with the access network device.

An inactive (inactive) state may be referred to as a radio resource control inactive (radio resource control inactive, RRC-inactive) state. In a non-connected state, a terminal is not connected to an access network device (for example, an access network device), but the access network device may store a context of the terminal. The terminal may receive one or more of a paging message, a synchronization signal, a broadcast message, or system information from the access network device, but cannot perform data transmission such as a voice call or a large volume of Internet access data with the access network device.

The foregoing three states may be mutually switched. For example, when the terminal does not have a data service, the network side device sends an RRC release (release) message to the terminal, so that the terminal switches from the connected state to the idle state or the inactive state. When a network side has a downlink service requirement, the network side device periodically sends a paging (paging) message to the terminal. After being paged, the terminal is triggered to switch to the connected state, initiate random access, enter the connected state after completing random access, and receive downlink data sent from the network side. Alternatively, when the terminal has an uplink service requirement, the terminal also initiates random access, switches to the connected state, and sends uplink data after entering the connected state.

In this embodiment of this application, the idle state or the inactive state may be referred to as a non-connected state or a sleep state. The uplink data may include uplink small data (small data). The uplink small data may be service data with a small data volume, that is, service data whose quantity of bits is less than or equal to a preset value. The preset value is set according to a requirement. A small quantity of transmission resources are occupied during transmission of the service data. For example, the uplink small data may be service data of several bits (bits), service data of dozens of bits, or service data of hundreds of bits or thousands of bits. If the terminal in the non-connected state has an uplink service requirement, even if the uplink service is uplink small data, to transmit the uplink small data, the terminal needs to initiate random access first, perform a complete random access procedure, switch from the non-connected state to the connected state, and send the uplink small data in the connected state. After the uplink small data is sent, the network device may enable the terminal to remain in the connected state for a long time. According to these steps, large signaling overheads are caused, power consumption of the terminal is increased, and a data transmission delay is increased.

To reduce power consumption for sending the uplink small data when the terminal is in the non-connected state, and reduce the data transmission delay, in a possible implementation, the terminal may send the uplink small data to the access network device in a random access manner (for example, a 2-step random access manner or a 4-step random access manner) or a configured grant (configured grant, CG) manner.

FIG. 1a shows a 4-step random access manner, and the manner may include the following steps. Step (0): An access network device sends uplink resource configuration information to a terminal, and configure, for the terminal, an uplink resource used to send uplink data. Step (1): The terminal sends a message 1 (Msg1) to the access network device, to notify the access network device that there is a random access request. The message 1 may also be referred to as a random access preamble (random access preamble). Step (2): After receiving Msg1, the access network device sends a random access response to the terminal, where the random access response may also be referred to as a message 2 (Msg2). Step (3): After receiving the random access response, the terminal sends a message 3 (Msg3) to the access network device, where Msg3 may include uplink small data and other information. Step (4): The access network device sends a message 4 (Msg4) to the terminal, where the message 4 may include a response message determined by a lower layer of the access network device and/or higher layer feedback information that is determined by a higher layer of the access network device and that corresponds to the uplink small data. It should be noted that, in Step (1), when the terminal sends the random access preamble to the access network device, a preamble (preamble) used by the terminal is randomly selected from an optional preamble set. Msg2, Msg3, or Msg4 is scheduled by the access network device to the terminal through a physical downlink control channel (physical downlink control channel, PDCCH). For example, before sending Msg2, Msg3, and Msg4, the access network device sends the PDCCH used to schedule Msg2, Msg3, and Msg4, and sends or receives Msg2, Msg3, and Msg4 at a time-frequency resource location indicated by the PDCCH.

Figure 1B:
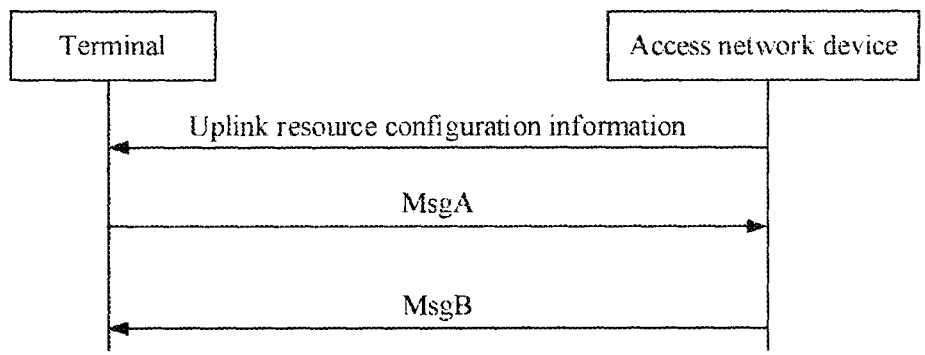
FIG. 1b is a schematic diagram of a 2-step random access manner.

FIG. 1b shows a 2-step random access manner, and the manner may include the following steps. Step (0): An access network device sends uplink configuration information to a terminal, where the uplink resource configuration information indicates a 2-step random access resource that is configured for the terminal to send uplink data. Step (1): The terminal sends MsgA to the access network device, where MsgA may include a preamble (preamble), and may further include a physical uplink shared channel (physical uplink shared channel, PUSCH) associated with the preamble, and the PUSCH includes uplink small data and other information. Step (2): The access network device receives MsgA, and returns MsgB to the terminal, where MsgB may include related information used for contention resolution between terminals, and may further include a response message determined by a lower layer of the access network device and/or higher layer feedback information that is determined by a higher layer of the access network device and that corresponds to the uplink small data. It should be noted that when the terminal sends MsgA to the access network device, a preamble used by the terminal is randomly selected from an optional preamble set or a dedicated preamble set corresponding to the 2-step random access manner. There is an association relationship between the PUSCH and the preamble selected by the terminal. MsgB is scheduled by the access network device to the terminal through a PDCCH. For example, before sending MsgB, the access network device sends the PDCCH used to schedule MsgB, and receives MsgB at a time-frequency resource location indicated by the PDCCH.

Figure 1C:
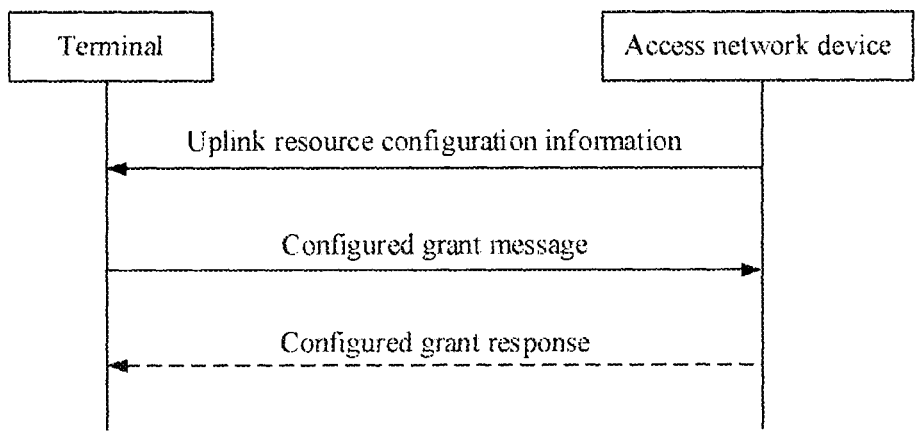
FIG. 1c is a schematic diagram of a CG manner.

FIG. 1c shows a CG manner. A network side preconfigures an uplink resource, or referred to as a CG resource, for a terminal. When the terminal has an uplink service requirement, the terminal directly transmits uplink data by using the preconfigured uplink resource. The CG manner may specifically include the following steps. Step (1): An access network device sends uplink resource configuration information to the terminal, and configures, for the terminal, an uplink resource used for sending uplink data. Step (2): The terminal sends a PUSCH including uplink small data to the access network device in the uplink resource configured by the access network device, where the PUSCH is carried in a configured grant message. Correspondingly, the access network device receives the uplink small data. Further, the CG manner shown in FIG. 1c may further include Step (3). As shown in Step (3), the access network device sends a configured grant response to the terminal, where the configured grant response may include a response message determined by a lower layer of the access network device and/or higher layer feedback information that is determined by a higher layer of the access network device and that corresponds to the uplink small data.

It should be noted that the CG described in this application is a name of a data transmission manner. The data transmission manner includes: preconfiguring a PUSCH resource for the terminal, and when the terminal has an uplink service requirement, sending uplink service data by using the preconfigured PUSCH resource. The data transmission manner is not limited to being named CG in this application, and may alternatively have another name. This is not limited.

When the terminal sends the uplink small data in the foregoing random access manner or CG manner, a requirement on channel quality is high. If the channel quality is poor, the terminal cannot send the uplink small data in the foregoing random access manner or CG manner, resulting in a failure of sending the uplink small data. Therefore, how to select a channel with high channel quality or a channel that can meet a transmission requirement of the uplink small data is a key problem of ensuring that the terminal successfully sends the uplink small data in a random access manner or the CG manner. For this problem, a person skilled in the art does not provide any solution. The conventional technology only provides a threshold configured by the access network device for the terminal to determine to initiate random access in a 2-step random access manner or a 4-step random access manner, moreover, this technical means cannot ensure/implement successful sending of the uplink small data in the random access manner or the CG manner.

To ensure that the terminal can successfully send the uplink small data in the random access manner or the CG manner, in a possible implementation, an embodiment of this application provides a data transmission method. The method may include the following steps. A threshold, for example, a first threshold, is broadcast on a network side, where the first threshold may indicate whether a terminal can send uplink small data in a random access manner. For example, the terminal determines that channel quality is greater than the first threshold, and determines to send the uplink small data in the random access manner or a CG manner. In addition, the network side broadcasts another threshold, for example, a second threshold, where the second threshold indicates whether the terminal sends the uplink small data in a 2-step random access manner or a 4-step random access manner when sending the uplink small data in the random access manner. Specifically, for this implementation, refer to the following descriptions in FIG. 4 to FIG. 5d.

In another possible implementation, the network side broadcasts a threshold, for example, a sixth threshold, where the sixth threshold indicates whether the terminal uses a 2-step random access resource (optionally, also including a CG resource) or a 4-step random access resource when sending the uplink small data or accessing a network. For example, when determining that the channel quality is greater than the sixth threshold, the terminal determines to send the uplink small data or access the network device by using the 2-step random access resource or the CG resource. In addition, two thresholds, for example, an eighth threshold and a seventh threshold, are broadcast on the network side. The two thresholds indicate whether the terminal can send the uplink small data in the random access manner when using the 2-step random access resource and the 4-step random access resource. If yes, the terminal sends the uplink small data in the random access manner. If no, the terminal first accesses the network, establishes a connection to a network side device, and then transmits the uplink small data. Specifically, for this implementation, refer to the following descriptions in FIG. 6 to FIG. 7*d*.

It should be noted that, in this application, sending the uplink data in the 2-step random access manner may be replaced with sending the uplink data based on the resource for the 2-step random access, sending the uplink data based on a PUSCH corresponding to MsgA in the 2-step random access manner, or the like. Sending the uplink data in the 4-step random access manner may be replaced with sending the uplink data based on the 4-step random access resource, sending the uplink data based on a PUSCH corresponding to Msg3 in the 4-step random access manner, or the like. Initiating random access in the 2-step random access manner may be replaced with initiating random access based on the 2-step random access resource, initiating random access based on a preamble corresponding to MsgA in the 2-step random access manner, or the like. Initiating random access in the 4-step random access manner may be replaced with initiating random access based on the 4-step random access resource, initiating random access based on a preamble corresponding to Msg1 in the 4-step random access manner, or the like.

The following describes the data transmission method provided in embodiments of this application with reference to the accompanying drawings of this specification. It should be noted that uplink data in the following embodiments may be uplink small data or other service data that can be sent in a random access process or a CG manner. This is not limited. For example, when the uplink data is sent based on a transmission resource (or referred to as a 2-step random access resource) corresponding to a 2-step random access manner, the uplink data is different from a preamble. From a perspective of a channel used by a physical layer, the uplink data may be data born/carried on a PUSCH corresponding to MsgA, the uplink data may be transmitted through the PUSCH, and the uplink data transmitted on the PUSCH corresponding to MsgA may be user plane (user plane, UP) data or control plane (control plane, CP) data, dedicated traffic channel (dedicated traffic channel, DTCH) data, or the like. This is not limited. From a perspective of the physical layer, the uplink data is a transport block (transport block, TB). From a perspective of a higher layer protocol, the uplink data is a media access control (media access control, MAC) packet data unit (packet data unit, PDU). When the uplink data is sent based on a transmission resource (or referred to as a 4-step random access resource) corresponding to a 4-step random access manner, Msg3 carrying the uplink data is different from Msg3 carrying control signaling in the conventional technology. In this application, the uplink data carried in Msg3 may be UP data, CP data, DTCH data, or the like. This is not limited.

The data transmission method provided in embodiments of this application may be applied to any one of a 4th generation (4th generation, 4G) system, a long term evolution (long term evolution. LTE) system, a 5th generation (5th generation, 5G) system, a new radio (new radio, NR) system, an NR-vehicle-to-everything (vehicle-to-everything, V2X) system, an Internet of Things system, or another next-generation communication system. This is not limited. The following uses a communication system shown in FIG. 2 as an example to describe the data transmission method provided in embodiments of this application.

Figure 2:
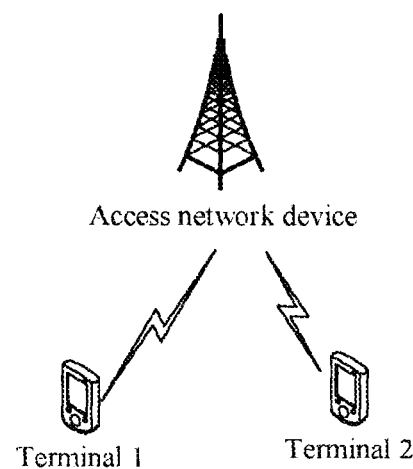
FIG. 2 is a simplified schematic diagram of a communication system according to an embodiment of this application.

FIG. 2 is a schematic diagram of a communication system according to an embodiment of this application. As shown in FIG. 2, the communication system may include an access network device and a plurality of terminals, for example, a terminal 1 and a terminal 2. In the system shown in FIG. 2, the terminal may be in an idle state or an inactive state. It should be noted that FIG. 2 is an example of a framework diagram. A quantity of nodes included in FIG. 2 is not limited. In addition to functional nodes shown in FIG. 2, another node may be further included, for example, a core network device, a gateway device, or an application server. This is not limited.

The access network device is mainly configured to implement functions such as resource scheduling, radio resource management, and radio access control of the terminal. Specifically, the access network device may be any node of a small base station, a wireless access point, a transmission reception point (transmission reception point, TRP), a transmission point (transmission point, TP), and another access node.

A terminal may be terminal equipment (terminal equipment), user equipment (user equipment, UE), a mobile station (mobile station, MS), a mobile terminal (mobile terminal, MT), or the like. Specifically, the terminal may be a mobile phone (mobile phone), a tablet computer, or a computer with a wireless transceiver function, or may be a virtual reality (virtual reality, VR) terminal, an augmented reality (augmented reality, AR) terminal, a wireless terminal in industrial control, a wireless terminal in self-driving, a wireless terminal in telemedicine, a wireless terminal in a smart grid, a wireless terminal in a smart city (smart city), a smart home, a vehicle-mounted terminal, or the like. In embodiments of this application, an apparatus configured to implement a function of the terminal may be a terminal, or may be an apparatus that can support the terminal in implementing the function, for example, a chip system (for example, a processing system including one chip or a plurality of chips). The following describes the data transmission method provided in embodiments of this application by using an example in which the apparatus for implementing the function of the terminal is a terminal.

Figure 3:
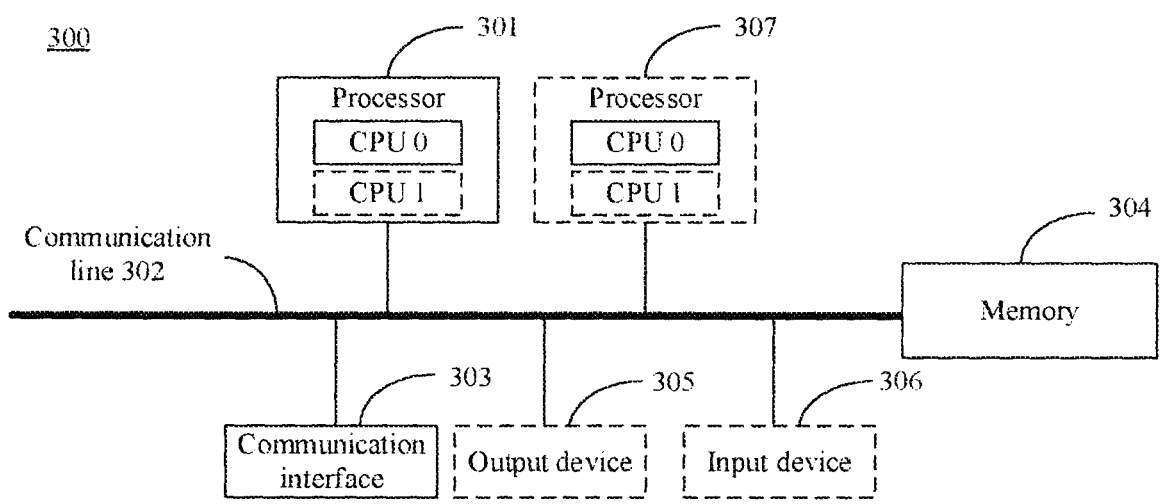
FIG. 3 is a schematic diagram of a communication apparatus according to an embodiment of this application.

During specific implementation, the network elements shown in FIG. 2, for example, the terminal and the access network device, may use a composition structure shown in FIG. 3 or include components shown in FIG. 3. FIG. 3 is a schematic composition diagram of a communication apparatus 300 according to an embodiment of this application. When the communication apparatus 300 has a function of the terminal described in embodiments of this application, the communication apparatus 300 may be a terminal, or a chip or a system-on-a-chip in the terminal. When the communication apparatus 300 has the function of the access network device in embodiments of this application, the communication apparatus 300 may be an access network device, or a chip or a system-on-a-chip in the access network device.

As shown in FIG. 3, the communication apparatus 300 may include a processor 301, a communication line 302, and a communication interface 303. Further, the communication apparatus 300 may include a memory 304. The processor 301, the memory 304, and the communication interface 303 may be connected to each other through the communication line 302.

The processor 301 may be a central processing unit (central processing unit, CPU), a general-purpose processor, a network processor (network processor, NP), a digital signal processor (digital signal processor, DSP), a microprocessor, a microcontroller, a programmable logic device (programmable logic device, PLD), or any combination thereof. The processor 301 may alternatively be another apparatus having a processing function, for example, a circuit, a component, or a software module.

The communication line 302 is configured to transmit information between the components included in the communication apparatus 300.

The communication interface 303 is configured to communicate with another device or another communication network. The another communication network may be an Ethernet, a radio access network (radio access network, RAN), a wireless local area network (wireless local area network, WLAN), or the like. The communication interface 303 may be a radio frequency module, a transceiver, or any apparatus that can implement communication. In this embodiment of this application, an example in which the communication interface 303 is the radio frequency module is used for description. The radio frequency module may include an antenna, a radio frequency circuit, and the like. The radio frequency circuit may include a radio frequency integrated chip, a power amplifier, and the like.

The memory 304 is configured to store instructions. The instructions may be a computer program.

The memory 304 may be a read-only memory (read-only memory, ROM) or another type of static storage device that can store static information and/or instructions, or may be a random access memory (random access memory, RAM) or another type of dynamic storage device that can store information and/or instructions, or may be an electrically erasable programmable read-only memory (electrically erasable programmable read-only memory, EEPROM), a compact disc read-only memory (compact disc read-only memory, CD-ROM) or other optical disk storage, Optical disc storage, or a magnetic disk storage medium or another magnetic storage device. The optical disc storage includes a compact disc, a laser disc, an optical disc, a digital versatile disc, a Blu-ray disc, and the like.

It should be noted that the memory 304 may exist independently of the processor 301, or may be integrated with the processor 301. The memory 304 may be configured to store instructions, program code, some data, or the like. The memory 304 may be located inside the communication apparatus 300, or may be located outside the communication apparatus 300. This is not limited. The processor 301 is configured to execute the instructions stored in the memory 304, to implement the data transmission method provided in the following embodiments of this application.

In an example, the processor 301 may include one or more CPUs, for example, a CPU 0 and a CPU 1 in FIG. 3.

In an optional implementation, the communication apparatus 300 includes a plurality of processors. For example, in addition to the processor 301 in FIG. 3, the communication apparatus 300 may further include a processor 307.

In an optional implementation, the communication apparatus 300 further includes an output device 305 and an input device 306. The input device 306 is a keyboard, a mouse, a microphone, a joystick, or the like, and the output device 305 is a device such as a display or a speaker (speaker).

It should be noted that the communication apparatus 300 may be a desktop computer, a portable computer, a network server, a mobile phone, a tablet computer, a wireless terminal, an embedded device, a chip system, or a device having a structure similar to that in FIG. 3. In addition, the composition structure shown in FIG. 3 does not constitute a limitation on the communication apparatus. In addition to the components shown in FIG. 3, the communication apparatus may include more or fewer components than those shown in the figure, or some components may be combined, or different component arrangements may be used.

In this embodiment of this application, the chip system may include a chip, or may include a chip and another discrete component.

The following describes the data transmission method provided in embodiments of this application with reference to the communication system shown in FIG. 2. Devices in the following embodiments may have the components shown in FIG. 3, and actions, terms, and the like in embodiments of this application may be mutually referenced. In embodiments, names of messages exchanged between devices, names of parameters in the messages, or the like are merely examples, and may alternatively be other names during specific implementation. This is not limited.

Figure 4:
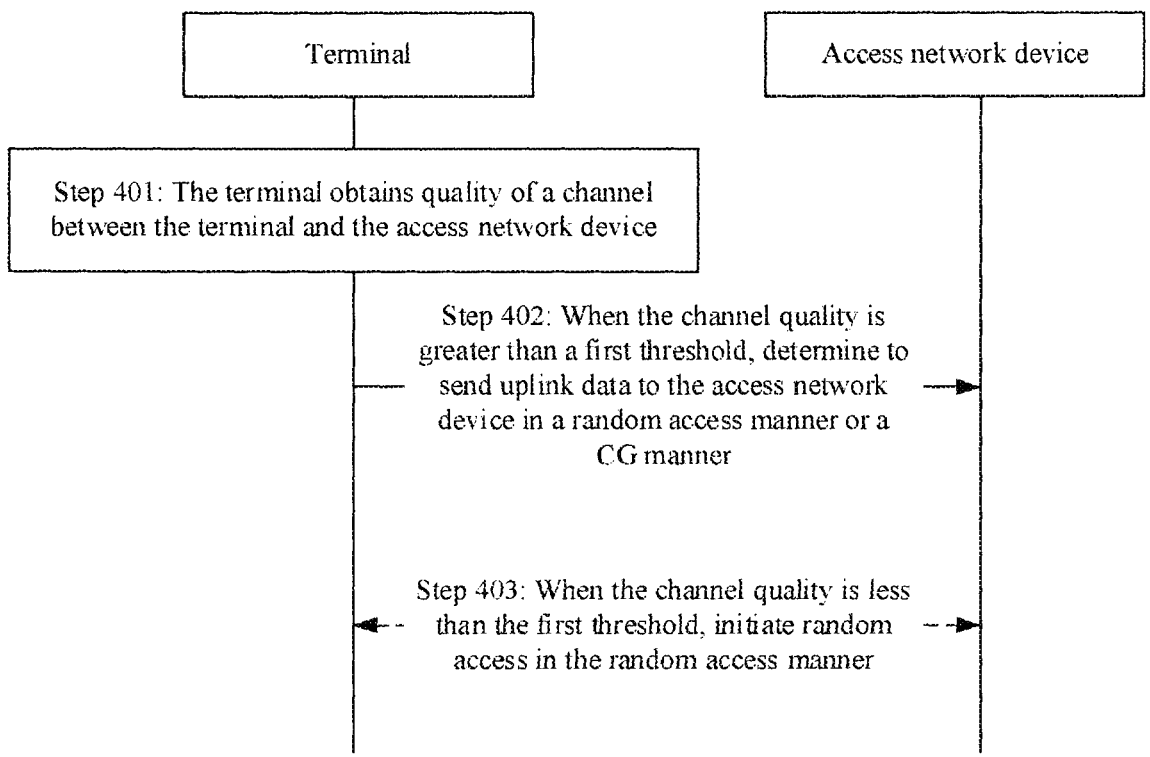
FIG. 4 is a flowchart of a data transmission method according to an embodiment of this application.

FIG. 4 shows a data transmission method according to an embodiment of this application. As shown in FIG. 4, the method may include the following steps.

Step 401: A terminal obtains quality of a channel between the terminal and an access network device.

The terminal may be any terminal in an idle state or an inactive state in the communication system shown in FIG. 2. The access network device may be any access network device that is in the communication system shown in FIG. 2 and that can provide a network service for the terminal.

The channel quality may be used to evaluate quality of a transmission channel between the terminal and the access network device. A shorter distance between the terminal and the access network device corresponds to better channel quality, and a better transmission channel between the terminal and the access network device corresponds to a higher probability of successfully transmitting uplink data. Otherwise, a longer distance between the terminal and the access network device corresponds to poorer channel quality, and a poorer transmission channel between the terminal and the access network device corresponds to a lower probability of successfully transmitting the uplink data. The channel quality may include reference signal received power (reference signal received power, RSRP), reference signal received quality (reference signal received quality, RSRQ), or a signal to interference plus noise ratio (signal to interference plus noise ratio, SINR).

For example, when the terminal is in a non-connected state, the quality of the channel between the terminal and the access network device may be obtained by measuring a synchronization signal block (synchronization signal block, SSB) broadcast by the access network device, or the quality of the channel between the terminal and the access network device may be obtained by measuring a preconfigured channel state information-reference signal (channel-state information-reference signal, CSI-RS). This is not limited. Specifically, for a measurement process, refer to the conventional technology.

Step 402: When the channel quality is greater than a first threshold, the terminal determines to send the uplink data to the access network device in a random access manner or a CG manner.

The first threshold may be preconfigured by the access network device for the terminal. For example, the access network device may send, to the terminal, an RRC message carrying the first threshold, and the terminal receives the RRC message, and obtains the first threshold from the RRC message. The RRC message may be a terminal specific RRC message, and a receiving object of the RRC message is the terminal. For example, the RRC message may be an RRC release message. Alternatively, the RRC message may be an RRC message broadcast by the access network device, and a receiving object of the RRC message may be a plurality of terminals. For example, the RRC message may be a system information block (system information block, SIB). The first threshold may indicate whether the terminal sends the uplink data in the random access manner or the CG manner. A value of the first threshold may be set as required. This is not limited.

The terminal may determine, based on whether a timing advance (timing advance, TA) is valid, to send the uplink data in the random access manner or send the uplink data to the access network device in the CG manner. For example, the terminal determines whether the TA is valid. When the TA is invalid, the terminal determines to send the uplink data to the access network device in the random access manner. When the TA is valid, the terminal determines to send the uplink data to the access network device in the CG manner.

The TA may be used for uplink time synchronization between the terminal and the access network device. When any one or more of the following three cases (1) to (3) exist, the TA is invalid. Otherwise, when none of the following three cases exist, the TA is valid. (1) When a validity period of the TA expires, the TA is invalid.

The validity period of the TA may be determined by the access network device and notified by the access network device to the terminal. After receiving the validity period of the TA notified by the access network device, the terminal starts a timer corresponding to the TA. Running duration of the timer is equal to the validity period of the TA. If the timer expires, the validity period of the TA expires.

(2) When a distance between a current location of the terminal and a location at which the terminal is located when the TA is started is greater than a distance threshold, the TA is invalid.

The distance threshold may be set as required. This is not limited. The distance threshold may be configured by the access network device for the terminal. A configuration manner of the distance threshold is the same as a manner of configuring the first threshold by the access network device for the terminal. Details are not described again. If the distance between the current location of the terminal and the location at which the terminal is located when the TA is started is less than the distance threshold, a moving distance of the terminal is small, the transmission channel between the terminal and the access network device does not change or changes slightly, and the TA is still applicable. Otherwise, if the distance between the current location of the terminal and the location at which the terminal is located when the TA is started is greater than the distance threshold, the moving distance of the terminal is large, and the terminal may be far away from the access network device, the transmission channel between the terminal and the access network device changes, for example, deteriorates, and the TA is invalid.

Alternatively, whether the TA is invalid may be determined based on the quality of the channel between the terminal and the access network device. For example, in a possible manner, a distance between the terminal and the access network device may be represented by the channel quality. A shorter distance between the terminal and the access network device corresponds to better channel quality, and a longer distance between the terminal and the access network device corresponds to poorer channel quality. When the channel quality of the terminal is less than a channel quality threshold, the TA is invalid. When the channel quality of the terminal is greater than the channel quality threshold, the TA is valid.

The channel quality threshold may be set as required, and the channel quality threshold may be configured by the access network device for the terminal. A configuration manner of the channel quality threshold is the same as the manner of configuring the first threshold by the access network device for the terminal. Details are not described again.

(3) When a difference between the channel quality and quality of the channel between the terminal and the access network device achieved when the TA is started is greater than a channel quality change threshold, the TA is invalid.

The channel quality change threshold may be set as required. This is not limited. The channel quality change threshold may be preconfigured by the access network device for the terminal. A configuration manner of the channel quality change threshold is the same as the manner of configuring the first threshold by the access network device for the terminal. Details are not described again. If the difference between the channel quality and the quality of the channel between the terminal and the access network device achieved when the TA is started is less than the channel quality change threshold, the transmission channel between the terminal and the access network device does not change or changes slightly, and the TA is still applicable. If the difference between the channel quality and the quality of the channel between the terminal and the access network device achieved when the TA is started is greater than the channel quality change threshold, the channel quality deteriorates, and the TA is invalid.

The terminal may determine, based on a second threshold, to send the uplink data in a 2-step random access manner or in a 4-step random access manner when sending the uplink data to the access network device in the random access manner. Specifically, the process may include: when the channel quality is greater than the second threshold, determining to send the uplink data to the access network device in the 2-step random access manner; or when the channel quality is less than the second threshold, determining to send the uplink data to the access network device in the 4-step random access manner.

The second threshold may be configured by the access network device for the terminal. A configuration manner of the second threshold is the same as a manner of configuring the first threshold by the access network device for the terminal. Details are not described again. The second threshold may be set as required. This is not limited. For example, the second threshold may be greater than the first threshold. The second threshold may be used by the terminal to select to send the uplink data to the access network device in the 2-step random access manner or send the uplink data to the access network device in the 4-step random access manner.

It should be noted that, in this embodiment of this application, corresponding to a same threshold, there are two cases: greater than the threshold and less than the threshold. "Greater than the threshold" may be replaced with "greater than or equal to the threshold", or "less than the threshold" may be replaced with "less than or equal to the threshold". In other words, for the same threshold, there may be cases as follows: greater than or equal to the threshold and less than the threshold, or greater than the threshold and less than or equal to the threshold. This is not limited. For example, in this application, "greater than the first threshold" and "less than the first threshold" may be replaced with the following descriptions: greater than the first threshold, and less than or equal to the first threshold; or greater than or equal to the first threshold, and less than the first threshold.

Further, as shown in FIG. 4, the method further includes the following step:

Step 403: When the channel quality is less than the first threshold, the terminal determines not to send the uplink data in the non-connected state, but to initiate random access in the random access manner, to access a cell corresponding to the access network device.

For example, the terminal may determine, based on a fifth threshold, to initiate random access in the 2-step random access manner or initiate random access in the 4-step random access manner. For example, when the channel quality is less than the first threshold and the channel quality is greater than the fifth threshold, the terminal determines not to send the uplink data to the access network device in the non-connected state, but to initiate random access in the 2-step random access manner to access the cell. When the channel quality is less than the first threshold and the channel quality is less than the fifth threshold, the terminal determines not to send the uplink data to the access network device in the non-connected state, but to initiate random access in the 4-step random access manner to access the cell.

The fifth threshold may be configured by the access network device for the terminal. A configuration manner of the fifth threshold is the same as the manner of configuring the first threshold by the access network device for the terminal. Details are not described again. The fifth threshold may be set as required. This is not limited. For example, the fifth threshold may be less than the first threshold. The fifth threshold may be used by the terminal to select to initiate random access in the 2-step random access manner or initiate random access in the 4-step random access manner.

According to the method shown in FIG. 4 the terminal may properly select, based on the first threshold and the second threshold, a manner of sending the uplink data. This improves transmission efficiency of the uplink data, and avoids a problem that uplink data transmission fails and a resource waste is caused because channel quality corresponding to the selected transmission manner is poor.

Further, after determining to send the uplink data in the 2-step random access manner, the terminal may send the uplink data based on a transmission resource corresponding to the 2-step random access manner. The transmission resource corresponding to the 2-step random access manner may be referred to as a 2-step random access resource, a transmission resource corresponding to MsgA, or the like. In this application, the 2-step random access manner may correspond to one group of transmission resources or a plurality of groups of transmission resources. This is not limited. The transmission resource corresponding to the 2-step random access manner may be preconfigured by the access network device for the terminal. One group of transmission resources may include a preamble and a PUSCH. The terminal may send MsgA in the group of transmission resources corresponding to the 2-step random access manner. MsgA includes a preamble and a PUSCH that carries the uplink data.

In an example, when there is only one transmission resource corresponding to the 2-step random access manner, the terminal may send the uplink data based on the unique transmission resource.

In another example, when there are a plurality of transmission resources corresponding to the 2-step random access manner, and different transmission resources correspond to different channel quality, for example, different transmission resources correspond to different modulation and coding schemes (modulation and coding schemes, MCSs) and/or transport block speeds (transmission block speeds, TBSs), to ensure that the uplink data is successfully transmitted and the PUSCH used to transmit the uplink data is successfully decoded, the terminal needs to select a proper transmission resource or a transmission resource with good channel quality from the plurality of groups of transmission resources, to transmit the uplink data. For example, the terminal may select, based on a third threshold, a first transmission resource from the plurality of transmission resources corresponding to the 2-step random access manner, and send the preamble and the uplink data to the access network device on MsgA based on the first transmission resource, where the uplink data is carried on the PUSCH corresponding to MsgA.

The third threshold may be configured by the access network device for the terminal. A configuration manner of the third threshold is the same as the manner of configuring the first threshold by the access network device for the terminal. Details are not described again. The third threshold may be set as required. This is not limited. For example, the third threshold may be greater than the first threshold, the third threshold may be equal to the second threshold, or the third threshold may be less than or equal to a smallest threshold in the at least one threshold. The third threshold may be used by the terminal to select, when sending the uplink data in the 2-step random access manner, the proper corresponding transmission resource used to transmit the uplink data. An association relationship between the third threshold and the first transmission resource is shown in the following Manner (1) to Manner (3).

Manner (1): The 2-step random access manner may correspond to one or more groups of transmission resources. The one or more groups of transmission resources include the first transmission resource. Configuration information corresponding to each transmission resource includes one or more thresholds. The threshold included in the configuration information corresponding to each group of transmission resources is used by the terminal to determine whether to select the transmission resource. For example, if the channel quality is greater than the threshold included in the configuration information corresponding to the transmission resource, the transmission resource may be selected by the terminal to send MsgA, where MsgA includes the preamble and the PUSCH that carries the uplink data Otherwise, a PUSCH corresponding to the transmission resource cannot be selected by the terminal to send the uplink data. When the channel quality is less than thresholds included in configuration information corresponding to all the transmission resources, the uplink data is sent to the access network device in the 4-step random access manner.

A threshold corresponding to each transmission parameter may be carried in the configuration information and configured for the terminal. For a configuration manner of the threshold, refer to the foregoing manner of configuring the first threshold by the access network device for the terminal. Details are not described again. The third threshold may be included in at least one threshold corresponding to the at least one group of transmission resources.

For example, after the terminal obtains the quality of the channel between the terminal and the access network device, the terminal may compare the channel quality with thresholds corresponding to the transmission resources configured by the access network device, to determine thresholds that are in the thresholds corresponding to the at least one group of transmission resources and that the channel quality is greater than. The terminal sends MsgA by using a transmission resource (for example, the first transmission resource) corresponding to a largest threshold (for example, the third threshold) in these thresholds, where MsgA includes the preamble and the PINCH that carries the uplink data; or the terminal sends MsgA by using a transmission resource corresponding to the determined thresholds, where MsgA includes the preamble and the PUSCH that carries the uplink data. This is not limited.

For example, the uplink data is uplink small data, and the channel quality is RSRP. As shown in the following code, a field MsgA-RSRP-TheresholdsmallData-r17 is added to configuration information that is configured by the access network device for the terminal and that corresponds to MsgA. MsgA-RSRP-TheresholdsmallData-r17 specifically indicates an RSRP threshold, the RSRP threshold indicates whether the terminal sends the uplink small data by using MsgA, and MsgA-RSRP-TheresholdsmallData-r17 may represent a condition under which a PUSCH resource in the transmission resource indicated by the configuration information can be used to send the uplink small data. When the channel quality is less than MsgA-RSRP-TheresholdsmallData-r17 in all configuration information, the terminal sends the uplink small data in the 4-step random access manner. It should be noted that for specific meanings of fields other than the MsgA-RSRP-TheresholdsmallData-r17 field in the following code, refer to descriptions in the conventional technology. Details are not described.

parameters. One threshold is correspondingly set for one transmission parameter range, and a threshold corresponding to each transmission parameter range may be used by the terminal to select whether to send the uplink data based on the transmission resource. For example, if the channel quality is greater than the threshold corresponding to the transmission parameter range, a transmission resource corresponding to a group of transmission parameters in the transmission parameter range may be selected by the terminal to send MsgA, where MsgA includes the preamble and the PUSCH that carries the uplink data; or if the channel quality is not greater than the threshold corresponding to the transmission parameter range, a PUSCH corresponding to the transmission resource may not be selected by the terminal to send the uplink data. When the channel quality is less than thresholds corresponding to all transmission parameter ranges, the uplink data is sent in the 4-step random access manner.

The transmission parameter range and the threshold corresponding to the transmission parameter range may be configured by the access network device for the terminal. For a configuration manner of the transmission parameter

```
MsgA-PUSCH-Resource-r16::=SEQUENCE {
  MsgA-PUSCH-PreambleGroup-r16 NUMERATED{groupA,groupB}          OPTIONAL,-- Need S
    MsgA-MCS-r16                        INTEGER (0..15),
    nrofSlotsMsgA-PUSCH-r16             INTEGER (1..4),
    nrofMsgA-PO-PerSlot-r16             ENUMERATED {one, two, three, six},
    MsgA-PUSCH-TimeDomainOffset-r16             INTEGER (1..32),
    MsgA-PUSCH-TimeDomainAllocation-r16                             INTEGER
(1..maxNrofUL-Allocations)              OPTIONAL, -- Need S
    startSymbolAndLengthMsgA-PO-r16             INTEGER(0..127)    OPTIONAL, Need S
    mappingTypeMsgA-PUSCH-r16           NUMERATED{typeA,typeB}     OPTIONAL, Need S
    guardPeriodMsgA-PUSCH-r16               INTEGER(0..3) OPTIONAL, Need R
    guardBandMsgA-PUSCH-r16                 INTEGER (0..1),
    frequencyStartMsgA-PUSCH-r16                                   INTEGER
(0..maxNrofPhysicalResourceBlocks-1),
    nrofPRBs-PerMsgA-PO-r16                 INTEGER (1..32),
    nrofMsgA-PO-FDM-r16                 ENUMERATED {one, two, four, eight},
    MsgA-IntraSlotFrequencyHopping-r16      ENUMERATED {enabled} OPTIONAL, Need R
    MsgA-HoppingBits-r16                BIT STRING(SIZE(2)) OPTIONAL, Need R
    MsgA-DMRS-Config-r16                MsgA-DMRS-Config-r16,
    nrofDMRS-Sequences-r16              INTEGER (1..2),
    MsgA-Alpha-r16                      ENUMERATED {alpha0, alpha04, alpha05,
alpha06, alpha07, alpha08, alpha09, alpha1}         OPTIONAL, -- Need S
    interlaceIndexFirstPO-MsgA-PUSCH-r16        INTEGER (1..10)    OPTIONAL, Need R
    nrofInterlacesPerMsgA-PO-r16        INTEGER(1..10) OPTIONAL, Need R
  MsgA-RSRP-ThresholdsmallData-r17          RSRP-Range OPTIONAL, Cond 2Step 4Step
}
```

Manner (2): The 2-step random access manner may correspond to at least one group of transmission resources (for example, one or more groups of transmission resources), the at least one group of transmission resources includes the first transmission resource, the at least one group of transmission resources may correspond to at least one group of transmission parameters, and the one group of transmission parameters may include an MCS and/or a TBS. The at least one group of transmission parameters may be divided into at least one transmission parameter range, a maximum value of the transmission parameter range may be or may be greater than a largest value in the at least one group of transmission parameters, and a minimum value of the transmission parameter range may be or may be less than a smallest value in the at least one group of transmission range and the threshold corresponding to the transmission parameter range, refer to the foregoing manner of configuring the first threshold by the access network device for the terminal. Details are not described again. The third threshold may be included in the at least one threshold, and a transmission parameter of the first transmission resource belongs to a transmission parameter range corresponding to the third threshold.

For example, after the terminal obtains the quality of the channel between the terminal and the access network device, the terminal may compare the channel quality with thresholds corresponding to the transmission parameter ranges configured by the access network device, to determine thresholds that are in the at least one threshold and that the channel quality is greater than, and send the uplink data by using a transmission resource (for example, the first transmission resource) that corresponds to any transmission parameter in a transmission parameter range corresponding to a largest threshold (for example, the third threshold) of these thresholds, or send the uplink data by using a transmission resource that corresponds to any transmission parameter in a transmission parameter range corresponding to any one of the determined thresholds. This is not limited.

It should be noted that, in this application, transmission parameters included in different transmission parameter ranges may not overlap or may overlap. For example, a transmission parameter range 1 may include a transmission parameter range 2, or transmission parameters included in the transmission parameter range 1 and transmission parameter range 2 are different. This is not limited.

For example, the uplink data is uplink small data. The channel quality is RSRP, a transmission parameter is an MCS, a transmission parameter range is an MCS range, and there are three MCS ranges: an MCS range 1, an MCS range, and an MCS range 3. For example, a threshold corresponding to an MCS range is an RSRP threshold, and different RSRP thresholds each correspond to one MCS range. One MCS range may be defined by one upper bound (upper bound) and one lower bound (lower bound). Each bound corresponds to one transmission parameter. For example, each bound is a transmission parameter index value, that is, an MCS index value (1_MCS), and the transmission parameter index value uniquely indicates one transmission parameter. Specifically, the access network device may use the following signaling to carry an RSRP threshold and an MCS range, and send the signaling to the terminal. For example, in the following signaling, an RSRP-MCS-threshold list (MsgA-RSRP-MCS-TheresholdForsmallDataList-r17) corresponding to MsgA in R17 Protocol may include N RSRP-MCS-thresholds (MsgA-RSRP-MCS-TheresholdForsmallData-r17), where a value of N is 3. Each MsgA-RSRP-MCS-TheresholdForsmallData-r17 may include one RSRP threshold and a corresponding MCS range: MsgA-RSRP-MCS-TheresholdForsmallDataList-r17SEQUENCE SIZE (1 ... N)) OF MsgA-RSRP-MCS-TheresholdForsmallData-r17.

```
MsgA-RSRP-MCS-TheresholdForsmallData-r17 ::= SEQUENCE {
    MsgA-RSRP-TheresholdForsmallData-r17    RSRP-Range
    MsgA-MCS-RangeForsmallData-r17          SEQUENCE {upper,
                                                      lower}
}
```

The RSRP threshold and the MCS range may be represented in a table form. As shown in the following Table 1, a correspondence between the MCS range and the RSRP threshold is shown. An RSRP threshold 1 corresponds to the MCS range 1, an RSRP threshold 2 corresponds to the MCS range 2, and an RSRP threshold 3 corresponds to the MCS range 3. The terminal may compare the channel quality with the RSRP threshold 1 to the RSRP threshold 3. If it is found that the channel quality is greater than the RSRP threshold 2, the uplink data is sent by using a transmission resource that corresponds to a transmission parameter included in the MCS range 2 corresponding to the RSRP threshold 2. If it is found that the channel quality is less than a smallest threshold in the three RSRP thresholds, the uplink data is sent in the 4-step random access manner.

TABLE 1

| RSRP threshold 1 | MCS range 1 |
| RSRP threshold 2 | MCS range 2 |
| RSRP threshold 3 | MCS range 3 |

For another example, the uplink data is uplink small data. The channel quality is RSRP, the transmission parameter is a TBS, the transmission parameter range is a TBS range, there are three TBS ranges: a TBS range 1, a TBS range, and a TBS range 3, and thresholds corresponding to the TBS ranges are RSRP thresholds. Different RSRP thresholds each correspond to one TBS range. One TBS range can be defined by one upper bound and one lower bound. Specific values of the upper bound and the lower bound may be a size of a TBS. Specifically, the access network device may use the following signaling to carry an RSRP threshold and a TBS range, and send the signaling to the terminal. For example, in the following signaling, MsgA-RSRP-TBS-TheresholdForsmallDataList-r17 may include N RSRP-TBS-thresholds MsgA-RSRP-TBS-TheresholdForsmallData-r17, where a value of N is 3. Each MsgA-RSRP-TBS-TheresholdForsmallData-r17 includes one RSRP value and a corresponding TBS range.

```
MsgA-RSRP-TBS-TheresholdForsmallDataList-r17 SEQUENCE
    (SIZE(1..N)) OF
MsgA-RSRP-TBS-TheresholdForsmallData-r17
    MsgA-RSRP-TBS-TheresholdForsmallData-r17::=SEQUENCE {
    MsgA-RSRP-TheresholdForsmallData-r17    RSRP-Range
    MsgA-TBS-RangeForsmallData-r17          SEQUENCE {upper, lower}
    }
```

The RSRP threshold and the TBS range may be represented in a table form. As shown in the following Table 2, a correspondence between the TBS range and the RSRP threshold is shown. An RSRP threshold 1 corresponds to the TBS range 1, an RSRP threshold 2 corresponds to the TBS range 2, and an RSRP threshold 3 corresponds to the TBS range 3. The terminal may compare the channel quality with the RSRP threshold 1 to the RSRP threshold 3. If it is found that the channel quality is greater than the RSRP threshold 2, the uplink data is sent by using a transmission resource that corresponds to a transmission parameter included in the TBS range 2 corresponding to the RSRP threshold 2. If it is found that the channel quality is less than a smallest, threshold in the three RSRP thresholds, the uplink data is sent in the 4-step random access manner.

TABLE 2

| RSRP threshold 1 | TBS range 1 |
| RSRP threshold 2 | TBS range 2 |
| RSRP threshold 3 | TBS range 3 |

Manner (3): The 2-step random access manner may correspond to at least one group of transmission resources. The at least one group of transmission resources includes the first transmission resource, the at least one group of transmission resources corresponds to at least one transmission parameter threshold, one transmission parameter threshold corresponds to one channel quality threshold (threshold for short in this application), and a threshold corresponding to a transmission parameter threshold corresponding to each group of transmission resources is used by the terminal to determine whether to select the transmission resource. For example, if the channel quality is greater than the threshold corresponding to the transmission parameter threshold corresponding to the transmission resource, the transmission resource may be selected by the terminal to send MsgA, where MsgA includes the preamble and the PUSCH that carries the uplink data. Otherwise, a PUSCH corresponding to the transmission resource cannot be selected by the terminal to send the uplink data. When the channel quality is less than thresholds corresponding to transmission parameter thresholds corresponding to all transmission resources, the uplink data is sent in the 4-step random access manner.

The transmission parameter, the transmission parameter threshold, and the channel quality threshold corresponding to the transmission parameter threshold may be configured by the access network device for the terminal. For a configuration manner, refer to the foregoing manner of configuring the first threshold by the access network device for the terminal. Details are not described again. The third threshold may be included in at least one threshold corresponding to the at least one transmission parameter threshold.

For example, after the terminal obtains the quality of the channel between the terminal and the access network device, the terminal may compare the channel quality with thresholds corresponding to transmission parameter thresholds configured by the access network device, to determine thresholds that are in the thresholds corresponding to the at least one transmission parameter threshold and that the channel quality is greater than. The terminal sends MsgA by using a transmission resource (for example, the first transmission resource) that corresponds to a transmission parameter threshold corresponding to a largest threshold (for example, a third threshold) in these thresholds, where MsgA includes the preamble and the PUSCH that carries the uplink data. Alternatively, the terminal sends MsgA by using a transmission resource that corresponds to a transmission parameter threshold corresponding to any one of the determined thresholds, where MsgA includes the preamble and the PUSCH that carries the uplink data. This is not limited.

For example, the uplink data is uplink small data. The channel quality is RSRP, the transmission parameter is an MCS, and the transmission parameter threshold is an MCS threshold. There are three MCS thresholds: the MCS threshold 1, the MCS threshold, and the MCS threshold 3. For example, a threshold corresponding to the MCS threshold is an RSRP threshold. Different RSRP thresholds each correspond to one MCS threshold. One MCS threshold may correspond to one index value 1_MCS. Specifically, the access network device may use the following signaling to carry an RSRP threshold and an MCS threshold, and send the signaling to the terminal. For example, in the following signaling, MsgA-RSRP-MCS-TheresholdForsmallDataList-r17 includes N pieces of MsgA-RSRP-MCS-TheresholdForsmallData-r17, where a value of N is 3. Each MsgA-RSRP-MCS-TheresholdForsmallData-r17 includes one RSRP threshold and a corresponding MCS index value, and the MCS index value is one corresponding MCS threshold.

```
MsgA-RSRP-MCS-TheresholdForsmallDataList-r17    SEQUENCE
(SIZE(1..N)) OF MsgA-RSRP-MCS-TheresholdForsmallData-r17
    MsgA-RSRP-MCS-TheresholdForsmallData-r17::=SEQUENCE {
        MsgA-RSRP-TheresholdForsmallData-r17    RSRP-Range
        MsgA-MCS-RangeForsmallData-r17    INTEGER (1..32)
}
```

The RSRP threshold and the MCS threshold may be represented in a table form. The following Table 3 shows a correspondence between the MCS threshold and the RSRP threshold. The RSRP threshold 1 corresponds to the MCS threshold 1, the RSRP threshold 2 corresponds to the MCS threshold 2, and the RSRP threshold 3 corresponds to the MCS threshold 3. The terminal may compare the channel quality with the RSRP threshold 1 to the RSRP threshold 3. If it is found that the channel quality is greater than the RSRP threshold 2, MsgA is sent by using a transmission resource that corresponds to the MCS threshold 2 corresponding to the RSRP threshold 2, where MsgA includes the preamble and the PUSCH that carries the uplink data. If it is found that the channel quality is less than a smallest threshold in the three RSRP thresholds, the uplink data is sent in the 4-step random access manner.

TABLE 3

| RSRP threshold 1 | MCS threshold 1 |
| --- | --- |
| RSRP threshold 2 | MCS threshold 2 |
| RSRP threshold 3 | MCS threshold 3 |

For another example, the uplink data is uplink small data. The channel quality is RSRP, the transmission parameter is a TBS, and the transmission parameter threshold is a TBS threshold. There are three TBS thresholds: a TBS threshold 1, a TBS threshold, and a TBS threshold 3. A threshold corresponding to the TBS threshold is an RSRP threshold. Different RSRP thresholds each correspond to one TBS threshold. One TBS threshold may correspond to one index value 1_TBS. Specifically, the access network device may use the following signaling to carry an RSRP threshold and a TBS threshold, and send the signaling to the terminal. For example, in the following signaling, MsgA-RSRP-TBS-TheresholdForsmallDataList-r17 includes N pieces of MsgA-RSRP-TBS-TheresholdForsmallData-r17, where a value of N is 3. Each MsgA-RSRP-TBS-TheresholdForsmallData-r17 includes one RSRP threshold and a corresponding TBS index value, and the TBS index value is one corresponding TBS threshold.

```
MsgA-RSRP-TBS-TheresholdForsmallDataList-r17    SEQUENCE
(SIZE(1..N))
OF MsgA-RSRP-TBS-TheresholdForsmallData-r17
    MsgA-RSRP-TBS-TheresholdForsmallData-r17::=SEQUENCE {
        MsgA-RSRP-TheresholdForsmallData-r17    RSRP-Range
        MsgA-TBS-RangeForsmallData-r17    ENUMERATED {size1,
        size2,...,size
M}
    }
```

The RSRP threshold and the TBS threshold may be represented in a table form. As shown in the following Table 4, a correspondence between the TBS threshold and the RSRP threshold is shown. The RSRP threshold 1 corresponds to the TBS threshold 1, the RSRP threshold 2 corresponds to the TBS threshold 2, and the RSRP threshold 3 corresponds to the TBS threshold 3. The terminal may compare the channel quality with the RSRP threshold 1 to the RSRP threshold 3. If it is found that the channel quality is greater than the RSRP threshold 2, MsgA is sent by using a transmission resource that corresponds to the TBS threshold 2 corresponding to the RSRP threshold 2, where MsgA includes the preamble and the PUSCH that carries the uplink data. If it is found that the channel quality is less than a smallest threshold in the three RSRP thresholds, the uplink data is sent in the 4-step random access manner.

TABLE 4

| RSRP threshold 1 | TBS threshold 1 |
| RSRP threshold 2 | TBS threshold 2 |
| RSRP threshold 3 | TBS threshold 3 |

Further, after determining to send the uplink data in the CG manner, the terminal may send the uplink data based on a CG resource corresponding to the CG manner. Specifically, in an example, when there is only one CG resource corresponding to the CG manner, for example, a PUSCH resource, the terminal may send the uplink data based on the only CG resource.

In another example, when there are a plurality of CG resources corresponding to the CG manner, and different CG resources correspond to different channel quality, for example, different CG resources correspond to different MCSs and/or TBSs, to ensure that the uplink data is successfully transmitted, and the PUSCH for transmitting the uplink data is successfully decoded, the terminal needs to select a proper CG resource/a CG resource with good channel quality from the plurality of CG resources, to transmit the uplink data. For example, the terminal may select, based on a fourth threshold, a first CG resource from the plurality of CG resources corresponding to the CG manner, and send the uplink data to the access network device based on the first CG resource. For example, when the channel quality is greater than the fourth threshold, the terminal sends the uplink data to the access network device based on the first CG resource.

The CG resource corresponding to the CG manner is a PUSCH resource that is preconfigured by the access network device and that is used by the terminal in the non-connected state. A manner of configuring the CG resource by the access network device for the terminal is the same as the manner of configuring the first threshold by the access network device for the terminal. Details are not described again. Similar to the association relationship between the third threshold and the first transmission resource, a relationship between the fourth threshold and the first CG resource may also include any one of the following three association relationships.

(1) The CG manner may correspond to one or more CG resources, the one or more CG resources include the first CG resource, and configuration information corresponding to each CG resource includes one threshold or more thresholds. The threshold included in the configuration information corresponding to each CG resource is used by the terminal to determine whether to select the CG resource. If the channel quality is greater than the threshold included in the configuration information corresponding to the CG resource, the terminal selects the CG resource to send the uplink data; or if the channel quality is not greater than the threshold included in the configuration information corresponding to the CG resource, the terminal does not select the CG resource to send the uplink data. When the channel quality is less than thresholds included in the configuration information corresponding to all the CG resources, the uplink data is not sent in the CG manner, but the uplink data is sent in the random access manner.

The configuration information corresponding to the first CG resource includes the fourth threshold. For example, after the terminal obtains the quality of the channel between the terminal and the access network device, the terminal may compare the channel quality with thresholds corresponding to the CG resources configured by the access network device, to determine thresholds that are in the thresholds corresponding to the at least one CG resource and that the channel quality is greater than. The terminal sends the uplink data by using a CG resource (for example, the first CG resource) corresponding to a largest threshold (for example, the third threshold) in these thresholds, or sends the uplink data by using a CG resource corresponding to any one of the determined thresholds. This is not limited.

Specifically, for an implementation thereof, refer to the descriptions in the foregoing Manner (1). Details are not described again.

(2) The CG manner may correspond to at least one CG resource, the at least one CG resource includes the first CG resource, the at least one CG resource may correspond to at least one transmission parameter, the at least one transmission parameter may be divided into at least one transmission parameter range, a largest value of the transmission parameter range may be or may be greater than a largest value of the one or more transmission parameters, and a smallest value of the transmission parameter range may be or may be less than a smallest value of the one or more transmission parameters. One threshold is correspondingly set for one transmission parameter range. A threshold corresponding to each transmission parameter range may be used by the terminal to select whether to send the uplink data based on the CG resource. For example, if the channel quality is greater than a threshold corresponding to a transmission parameter range, a CG resource corresponding to a transmission parameter in the transmission parameter range is selected to send the uplink data; otherwise, the CG resource is not selected to send the uplink data. When the channel quality is less than thresholds corresponding to all transmission parameter ranges, the uplink data is not sent in the CG manner, but the uplink data is sent in the random access manner.

The transmission parameter range and the threshold corresponding to the transmission parameter range may be configured by the access network device for the terminal. For a configuration manner of the transmission parameter range and the threshold corresponding to the transmission parameter range, refer to the foregoing manner of configuring the first threshold by the access network device for the terminal. Details are not described again. The fourth threshold may be included in the foregoing at least one threshold, and the transmission parameter corresponding to the first CG resource belongs to a transmission parameter range corresponding to the fourth threshold.

For example, after the terminal obtains the quality of the channel between the terminal and the access network device, the terminal may compare the channel quality with thresholds corresponding to the transmission parameter ranges configured by the access network device, to determine thresholds that are in the at least one threshold and that the channel quality is greater than, and send the uplink data by using a CG resource (for example, the first CG resource) that corresponds to any transmission parameter in a transmission parameter range corresponding to a largest threshold (for example, the fourth threshold) of these thresholds, or send the uplink data by using a CG resource that corresponds to any transmission parameter in a transmission parameter range corresponding to any one of the determined thresholds. This is not limited.

Specifically, for this implementation, refer to the descriptions in the foregoing Manner (2). Details are not described again.

(3) The CG manner may correspond to at least one CG resource. The at least one CG resource includes the first CG resource. The at least one CG resource corresponds to at least one transmission parameter threshold. One transmission parameter threshold corresponds to one channel quality threshold (threshold for short in this application). A threshold corresponding to a transmission parameter threshold corresponding to each CG resource is used by the terminal to determine whether to select the CG resource. If the channel quality is greater than the threshold corresponding to the transmission parameter threshold corresponding to the CG resource, the uplink data is not sent in the CG manner. Otherwise, when the channel quality is less than thresholds that correspond to transmission parameter thresholds corresponding to all the CG resources, the CG manner is not selected to send the uplink data, but the uplink data is sent in the random access manner.

The transmission parameter, the transmission parameter threshold, and the channel quality threshold corresponding to the transmission parameter threshold may be configured by the access network device for the terminal. For a configuration manner, refer to the foregoing manner of configuring the first threshold by the access network device for the terminal. Details are not described again. The fourth threshold may be included in at least one threshold corresponding to the at least one transmission parameter threshold.

For example, after the terminal obtains the quality of the channel between the terminal and the access network device, the terminal may compare the channel quality with the thresholds corresponding to the transmission parameter thresholds configured by the access network device, to determine thresholds that are in the thresholds corresponding to the at least one transmission parameter threshold and that the channel quality is greater than, and send the uplink data by using a CG resource (for example, the first CG resource) that corresponds to a transmission parameter threshold corresponding to a largest threshold (for example, the fourth threshold) of these thresholds, or send the uplink data by using a CG resource that corresponds to a transmission parameter threshold corresponding to any one of the determined thresholds. This is not limited.

Specifically, for this implementation, refer to the descriptions in the foregoing Manner (3). Details are not described again.

Further, after the terminal determines to send the uplink data in the 4-step random access manner, the terminal may initiate random access in the 4-step random access manner, and after receiving Msg2, send, in a transmission resource indicated by configuration information included in Msg2 sent by the access network device, Msg3 that carries the uplink data.

Figure 5A:
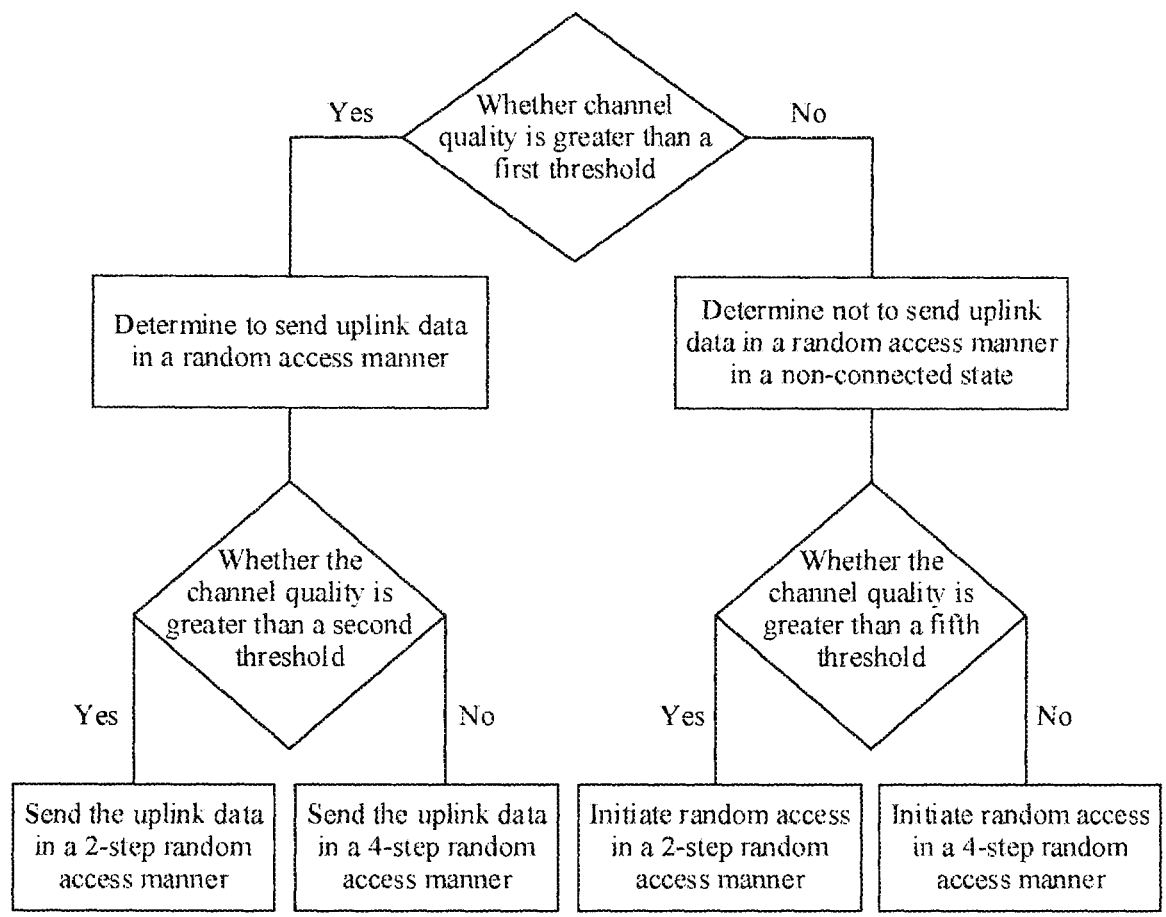
FIG. 5a is another flowchart of a data transmission method according to an embodiment of this application.

With reference to FIG. 5a, the following describes in detail that the terminal selects, based on the first threshold, the second threshold, and the fifth threshold, an appropriate manner to send the uplink data in the method shown in FIG. 4 by using an example in which the terminal does not support a CG and the access network device configures, for the terminal, a group of transmission resources corresponding to the 2-step random access manner.

The terminal obtains the quality of the channel between the terminal and the access network device, and compares the channel quality with the first threshold. When the channel quality is greater than the first threshold, the terminal determines to send the uplink data in the random access manner. When the channel quality is less than the first threshold, the terminal determines not to send the uplink data in the random access manner in the non-connected state, that is, does not send the uplink data by using a PUSCH resource corresponding to the random access manner. As shown in FIG. 5a, that the terminal determines to send the uplink data in the random access manner may include: comparing the channel quality with the second threshold; and when the channel quality is greater than the second threshold, determining to send the uplink data, in the 2-step random access manner, for example, send the uplink data through a PUSCH corresponding to MsgA in the 2-step random access manner; or when the channel quality is less than the second threshold, determining to send the uplink data in the 4-step random access manner.

As shown in FIG. 5a, after the terminal determines not to send the uplink data in the random access manner in the non-connected state, the terminal compares the channel quality with the fifth threshold. When the channel quality is greater than the fifth threshold, the terminal determines to initiate random access in the 2-step random access manner. Otherwise, when the channel quality is less than the fifth threshold, the terminal determines to initiate random access in the 4-step random access manner.

Figure 5B:
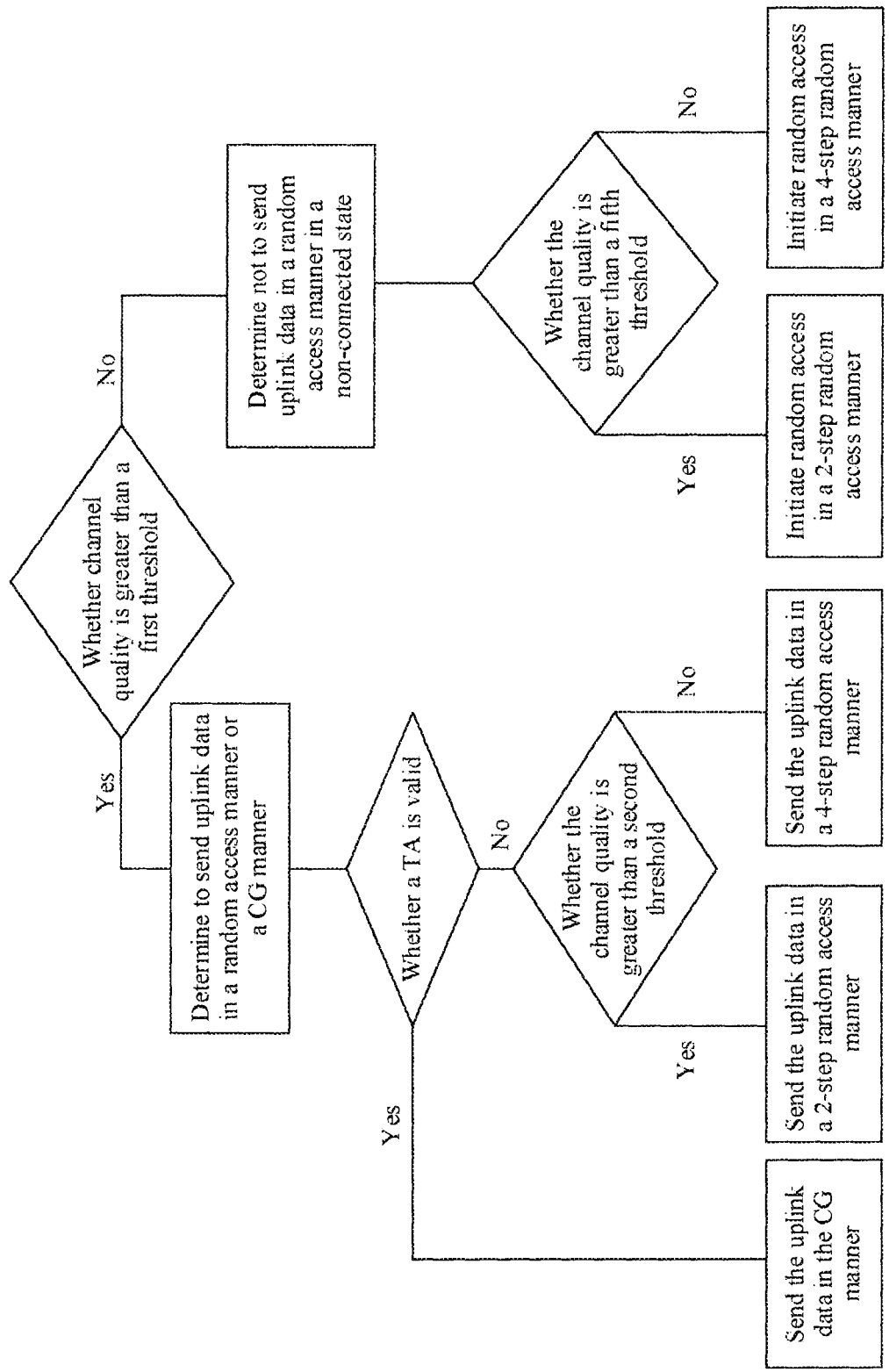
FIG. 5b is still another flowchart of a data transmission method according to an embodiment of this application.

With reference to FIG. 5b, the following describes in detail that the terminal selects, based on the first threshold, the second threshold, and the fifth threshold, an appropriate manner to send the uplink data in the method shown in FIG. 4 by using an example in which the terminal supports a CG and the access network device configures, for the terminal, a group of transmission resources corresponding to the 2-step random access manner.

The terminal obtains the quality of the channel between the terminal and the access network device, and compares the channel quality with the first threshold. When the channel quality is greater than the first threshold, the terminal determines to send the uplink data in the random access manner or the CG manner, and when the channel quality is less than the first threshold, the terminal determines not to send the uplink data in the random access manner in the non-connected state. As shown in FIG. 5b, that the terminal determines to send the uplink data in the random access manner or the CG manner may include: checking whether the TA is valid; if the TA is valid, determining to send the uplink data in the CG manner; or if the TA is invalid, comparing the channel quality with the second threshold; and when the channel quality is greater than the second threshold, determining to send the uplink data in the 2-step random access manner, for example, send MsgA based on a transmission resource corresponding to the 2-step random access manner, where MsgA includes the preamble and the PUSCH that carries the uplink data; and when the TA is invalid, and the channel quality is less than the second threshold, determining to send the uplink data in the 4-step random access manner.

As shown in FIG. 5b, after the terminal determines not to send the uplink data in the random access manner in the non-connected state, the terminal compares the channel quality with the fifth threshold. When the channel quality is greater than the fifth threshold, the terminal determines to initiate random access in the 2-step random access manner. Otherwise, when the channel quality is less than the fifth threshold, the terminal determines to initiate random access in the 4-step random access manner.

For a process of sending the uplink data by the terminal in the CG manner, refer to the foregoing descriptions. Details are not described again.

Figure 5C:
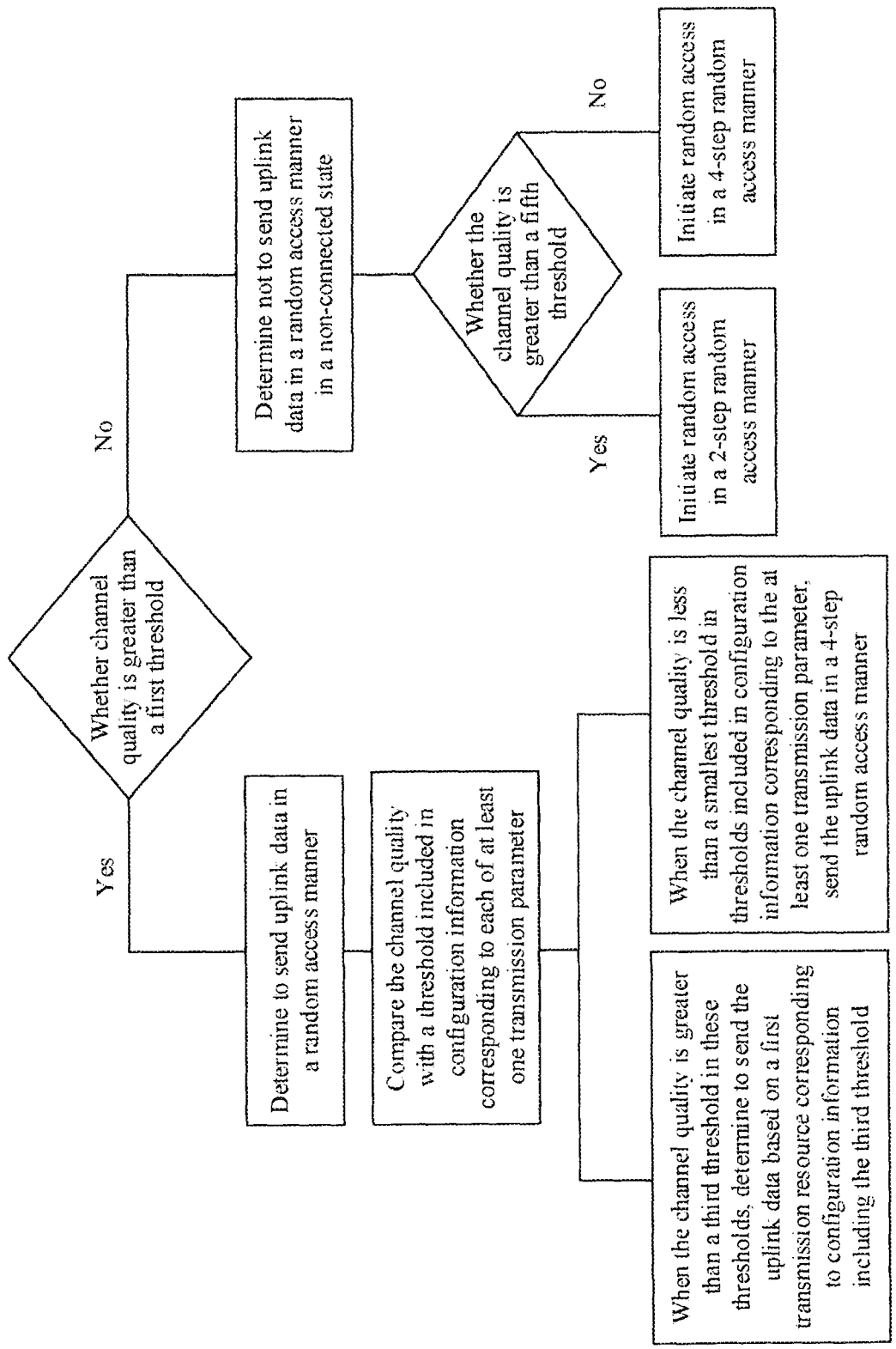
FIG. 5c is yet another flowchart of a data transmission method according to an embodiment of this application.

With reference to FIG. 5c, the following describes in detail that the terminal selects, based on the first threshold, the third threshold, and the fifth threshold, an appropriate manner to send the uplink data in the method shown in FIG. 4 by using an example in which the terminal does not support a CG, the access network device configures, for the terminal, a plurality of groups of transmission resources corresponding to the 2-step random access manner, and configuration information corresponding to the plurality of groups of transmission resources includes a threshold used by the terminal to determine whether to select the transmission resource. It should be noted that, for a data transmission manner in a case in which a plurality of groups of transmission resources correspond to transmission parameter ranges, a transmission parameter range corresponds to a threshold, or a plurality of groups of transmission resources correspond to transmission parameter thresholds, refer to FIG. 5c.

As shown in FIG. 5c, the terminal obtains the quality of the channel between the terminal and the access network device, and compares the channel quality with the first threshold. When the channel quality is greater than the first threshold, the terminal determines to send the uplink data in the random access manner, and when the channel quality is less than the first threshold, the terminal determines not to send the uplink data in the random access manner in the non-connected stale. As shown in FIG. 5c, that the terminal determines to send the uplink data in the random access manner may include: comparing the channel quality with a threshold included in configuration information corresponding to each of the at least one transmission parameter; when the channel quality is greater than the third threshold in these thresholds, determining to send MsgA based on the first transmission resource corresponding to the configuration information including the third threshold, where MsgA includes the preamble and the PUSCH that carries the uplink data; or when the channel quality is less than a smallest threshold in the thresholds included in the configuration information corresponding to the at least one transmission parameter, determining to send the uplink data in the 4-step random access manner.

As shown in FIG. 5c, after the terminal determines not to send the uplink data in the random access manner in the non-connected state, the terminal compares the channel quality with the fifth threshold. When the channel quality is greater than the fifth threshold, the terminal determines to initiate random access in the 2-step random access manner. Otherwise, when the channel quality is less than the fifth threshold, the terminal determines to initiate random access in the 4-step random access manner.

Figure 5D:
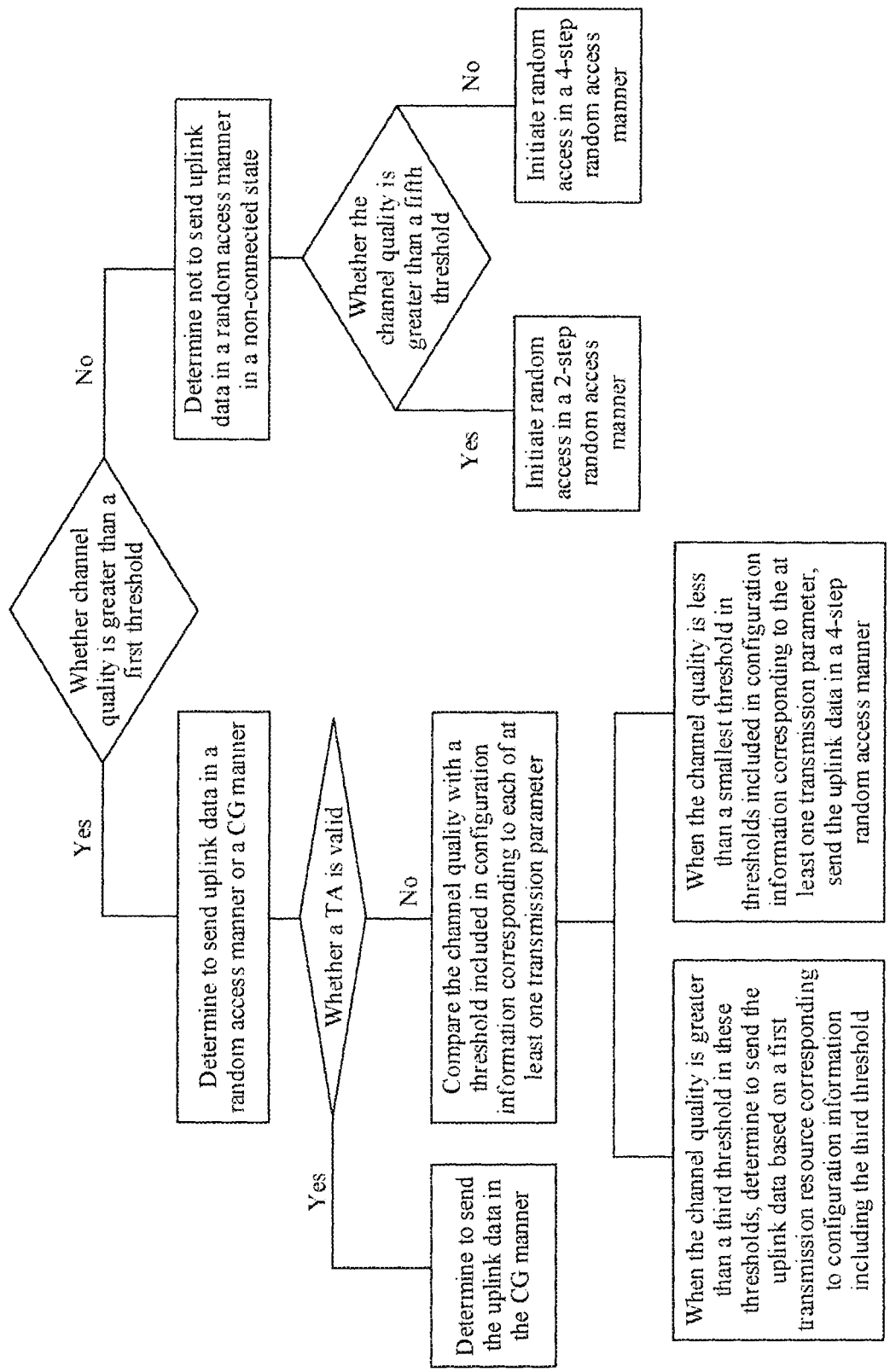
FIG. 5d is still yet another flowchart of a data transmission method according to an embodiment of this application.

With reference to FIG. 5d, the following describes in detail that the terminal selects, based on the first threshold, the third threshold, and the fifth threshold, an appropriate manner to send the uplink data in the method shown in FIG. 4 by using an example in which the terminal supports a CG, the access network device configures, for the terminal, a plurality of groups of transmission resources corresponding to the 2-step random access manner, and configuration information corresponding to the plurality of groups of transmission resources includes a threshold used by the terminal to determine whether to select the transmission resource. It should be noted that, for a data transmission manner in a case in which a plurality of groups of transmission resources correspond to transmission parameter ranges, a transmission parameter range corresponds to a threshold, or a plurality of groups of transmission resources correspond to transmission parameter thresholds, refer to FIG. 5d.

The terminal obtains the quality of the channel between the terminal and the access network device, and compares the channel quality with the first threshold. When the channel quality is greater than the first threshold, the terminal determines to send the uplink data in the random access manner or the CG manner, and when the channel quality is less than the first threshold, the terminal determines not to send the uplink data in the random access manner in the non-connected state. As shown in FIG. 5d, that the terminal determines to send the uplink data in the random access manner or the CG manner may include: checking whether the TA is valid; if the TA is valid, determining to send the uplink data in the CG manner; or if the TA is invalid, comparing the channel quality with a threshold included in configuration information corresponding to each of the at least one transmission parameter; when the channel quality is greater than the third threshold in these thresholds, determining to send MsgA based on the first transmission resource corresponding to the configuration information including the third threshold, where MsgA includes the preamble and the PUSCH that carries the uplink data; and if the TA is invalid, and the channel quality is less than a smallest threshold in the thresholds included in the configuration information corresponding to the at least one transmission parameter, determining to send the uplink data in the 4-step random access manner.

As shown in FIG. 5d, after the terminal determines not to send the uplink data in the random access manner in the non-connected state, the terminal compares the channel quality with the fifth threshold. When the channel quality is greater than the fifth threshold, the terminal determines to initiate random access in the 2-step random access manner. Otherwise, when the channel quality is less than the fifth threshold, the terminal determines to initiate random access in the 4-step random access manner.

For a process of sending the uplink data by the terminal in the CG manner, refer to the foregoing descriptions. Details are not described again.

FIG. 4 to FIG. 5d describe the data transmission method provided in this embodiment of this application by using an example the first threshold is configured for the terminal to select whether to send the uplink data in the random access manner and the second threshold is configured for the terminal to select whether to send the uplink data in the 2-step random access manner or the 4-step random access manner. Alternatively, in this application, a threshold used by the terminal to use a 2-step random access resource or a 4-step random access resource may be first configured, and then two thresholds are configured. One of the two thresholds is used by the terminal to determine whether to send the uplink data or initiate random access based on the 2-step random access resource, and the other threshold is used by the terminal to determine whether to send the uplink data or initiate random access based on the 4-step random access resource. Specifically, for this manner, refer to the following FIG. 6.

Figure 6:
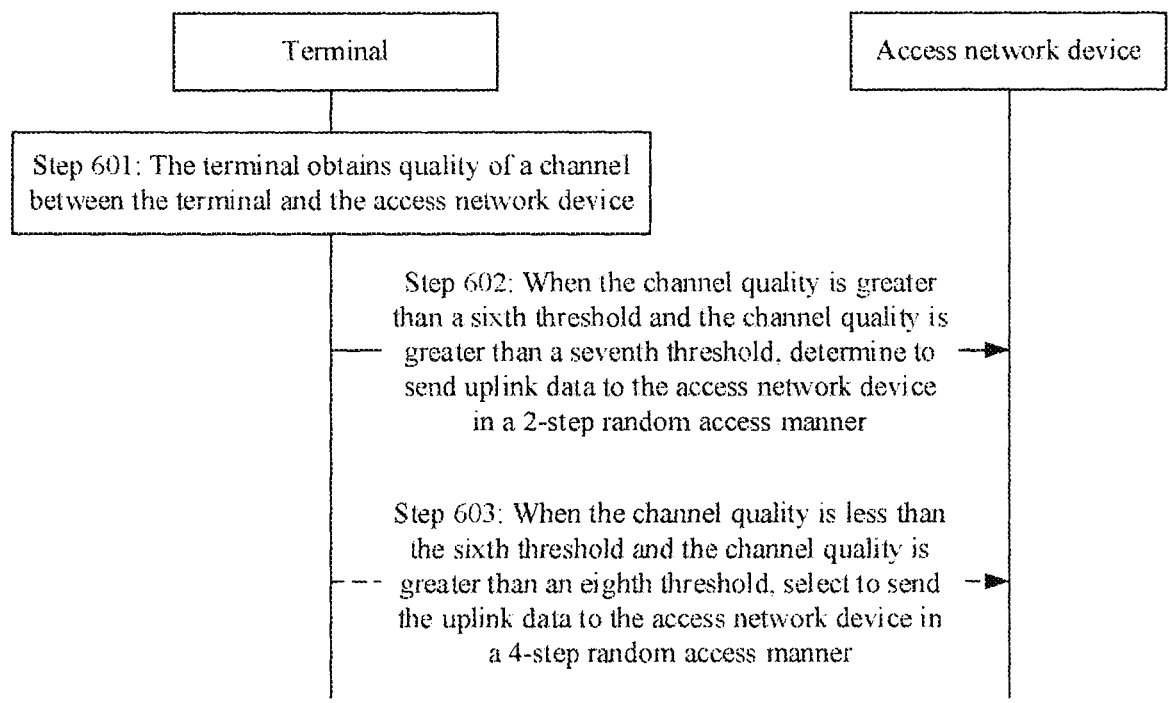
FIG. 6 is a flowchart of a data transmission method according to an embodiment of this application.

FIG. 6 is a flowchart of another data transmission method according to an embodiment of this application. As shown in FIG. 6, the method may include the following steps.

Step 601: A terminal obtains quality of a channel between the terminal and an access network device.

Specifically, for step 601, refer to step 401. Details are not described again.

Step 602: When the channel quality is greater than a sixth threshold and the channel quality is greater than a seventh threshold, the terminal determines to send uplink data to the access network device in a 2-step random access manner.

The sixth threshold may be preconfigured by the access network device for the terminal. A configuration manner of the sixth threshold is the same as the manner of configuring the first threshold by the access network device for the terminal. Details are not described again. The sixth threshold may be used by the terminal to select to use a 2-step random access resource (for example, select to use the 2-step random access resource to initiate random access or send the uplink data) or select to use a 4-step random access resource (for example, select to use the 4-step random access resource to initiate random access or send the uplink data).

The seventh threshold may be preconfigured by the access network device for the terminal. A configuration manner of the sixth threshold is the same as the manner of configuring the first threshold by the access network device for the terminal. Details are not described again. The seventh threshold may be greater than the sixth threshold, or may be less than or equal to the sixth threshold. This is not limited. The seventh threshold may be used by the terminal to select to send the uplink data in the 2-step random access manner or initiate random access in the 2-step random access manner. For example, when the channel quality is greater than the sixth threshold, the terminal compares the channel quality with the seventh threshold. When the channel quality is greater than the seventh threshold, the terminal determines to send the uplink data in the 2-step random access manner. When the channel quality is less than the seventh threshold, the terminal determines not to send the uplink data in the 2-step random access manner in a non-connected state, but to initiate random access in the 2-step random access manner, to access a cell corresponding to the access network device.

When the terminal supports a CG, if a TA is valid, to reduce signaling overheads, the terminal may send the uplink data in a CG manner more preferential than the 2-step random access manner. For example, when the channel quality is greater than the sixth threshold, before the terminal determines to send the uplink data to the access network device in the 2-step random access manner, the terminal determines whether the TA is valid. When the TA is invalid, the terminal compares the channel quality with the seventh threshold, and determines, based on a comparison result, to send the uplink data to the access network device in the 2-step random access manner. When the TA is valid, the terminal determines to send the uplink data to the access network device in the CG manner.

For related descriptions of the TA and a manner of determining whether the TA is invalid, refer to the descriptions in step 402. Details are not described again.

Further, after determining to send the uplink data to the access network device in the 2-step random access manner, the terminal may send MsgA based on a transmission resource corresponding to the 2-step random access manner. MsgA includes a preamble and a PUSCH that carries the uplink data. Specifically, for a process in which the terminal selects a proper transmission resource from one or more groups of transmission resources corresponding to the 2-step random access manner to send the uplink data, refer to the foregoing descriptions. Details are not described again.

Further, after determining to send the uplink data to the access network device in the CG manner, the terminal sends the uplink data based on a CG resource corresponding, to the CG manner. For a process in which the terminal selects a CG resource from the one or more CG resources corresponding to the CG manner to send the uplink data, refer to the foregoing descriptions. Details are not described again.

Step 603: When the channel quality is less than the sixth threshold, if the channel quality is greater than an eighth threshold, the terminal selects to send the uplink data to the access network device in a 4-step random access manner; or if the channel quality is less than an eighth threshold, the terminal selects to initiate random access in a 4-step random access manner, to access the cell corresponding to the access network device.

The eighth threshold may be preconfigured by the access network device for the terminal. A configuration manner of the sixth threshold is the same as the manner of configuring the first threshold by the access network device for the terminal. Details are not described again. The eighth threshold may be greater than the sixth threshold, or may be less than or equal to the sixth threshold. This is not limited. The eighth threshold may be used by the terminal to select to send the uplink data in the 4-step random access manner or initiate random access in the 4-step random access manner.

According to the method shown in FIG. 4, the terminal may properly select, based on the sixth threshold, the eighth threshold, and the seventh threshold, a manner of sending the uplink data. This improves transmission efficiency of the uplink data, and avoids a problem that uplink data transmission fails and a resource waste is caused because channel quality corresponding to the selected transmission manner is poor.

Figure 7A:
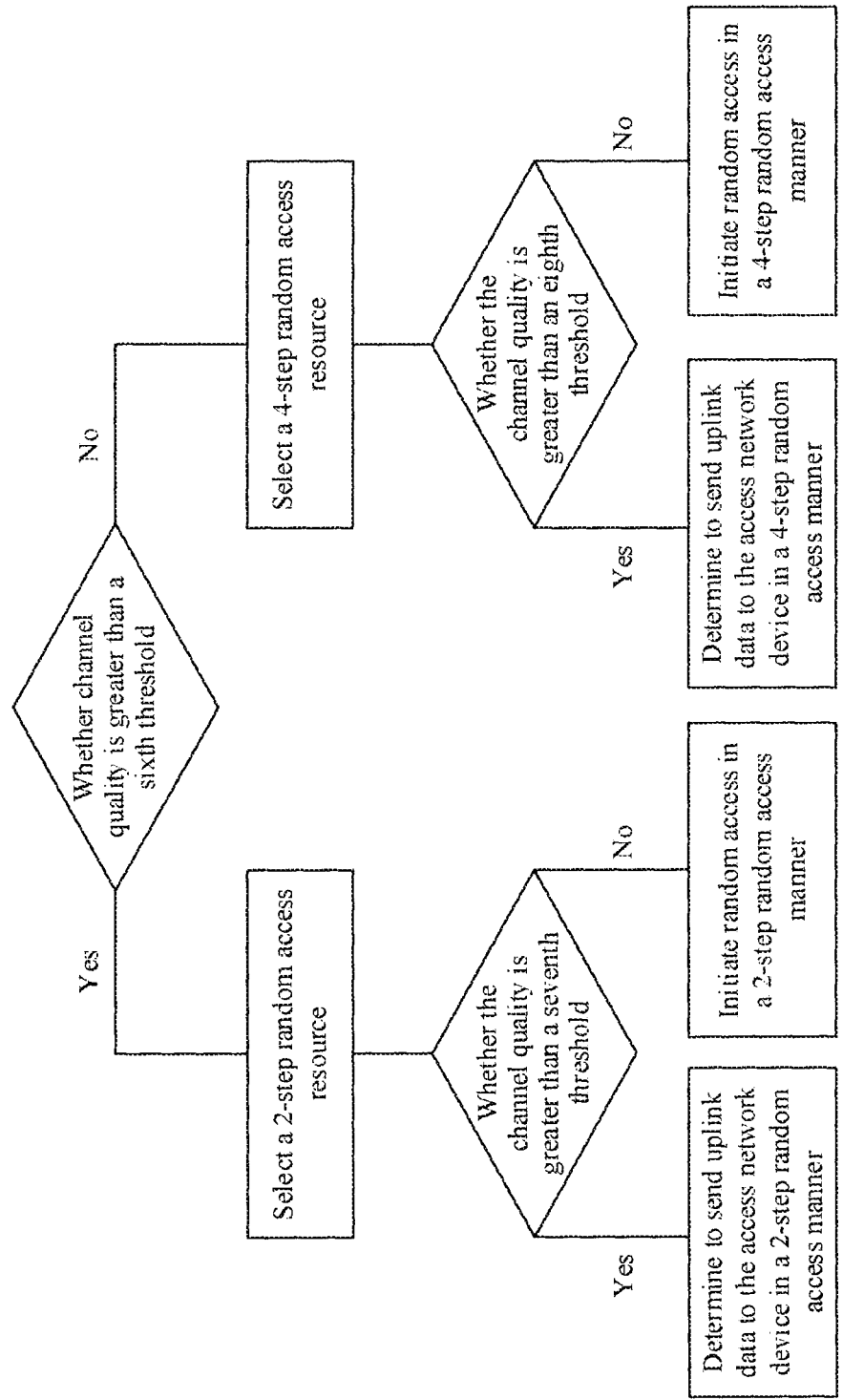
FIG. 7a is another flowchart of a data transmission method according to an embodiment of this application.

With reference to FIG. 7a, the following describes in detail that the terminal selects, based on the sixth threshold, the eighth threshold, and the seventh threshold, an appropriate manner to send the uplink data in the method shown in FIG. 6 by using an example in which the terminal does not support the CG and the access network device configures, for the terminal, a group of transmission resources corresponding to the 2-step random access manner.

The terminal obtains the quality of the channel between the terminal and the access network device, and compares the channel quality with the sixth threshold. When the channel quality is greater than the sixth threshold, the terminal selects to use the 2-step random access resource, or when the channel quality is less than the sixth threshold, the terminal selects to use the 4-step random access resource. As shown in FIG. 7a, after selecting to use the 2-step random access resource, the terminal compares the channel quality with the seventh threshold. When the channel quality is greater than the seventh threshold, the terminal determines to send the uplink data to the access network device in the 2-step random access manner, for example, send MsgA based on the transmission resource corresponding to the 2-step random access manner, where MsgA includes the preamble and the PUSCH that carries the uplink data. Otherwise, when the channel quality is less than the seventh threshold, the terminal determines not to send the uplink data in the 2-step random access manner in the non-connected state, but to initiate random access in the 2-step random access manner, to access the cell.

As shown in FIG. 7a, after selecting to use the 4-step random access resource, the terminal compares the channel quality with the eighth threshold. When the channel quality is greater than the eighth threshold, the terminal determines to send the uplink data to the access network device in the 4-step random access manner, for example, sends the uplink data by using Msg3 based on a transmission resource corresponding to the 4-step random access manner. Otherwise, when the channel quality is less than the eighth threshold, the terminal determines not to send the uplink data in the 4-step random access manner in the non-connected state, but to initiate random access in the 4-step random access manner, to access the cell.

Figure 7B:
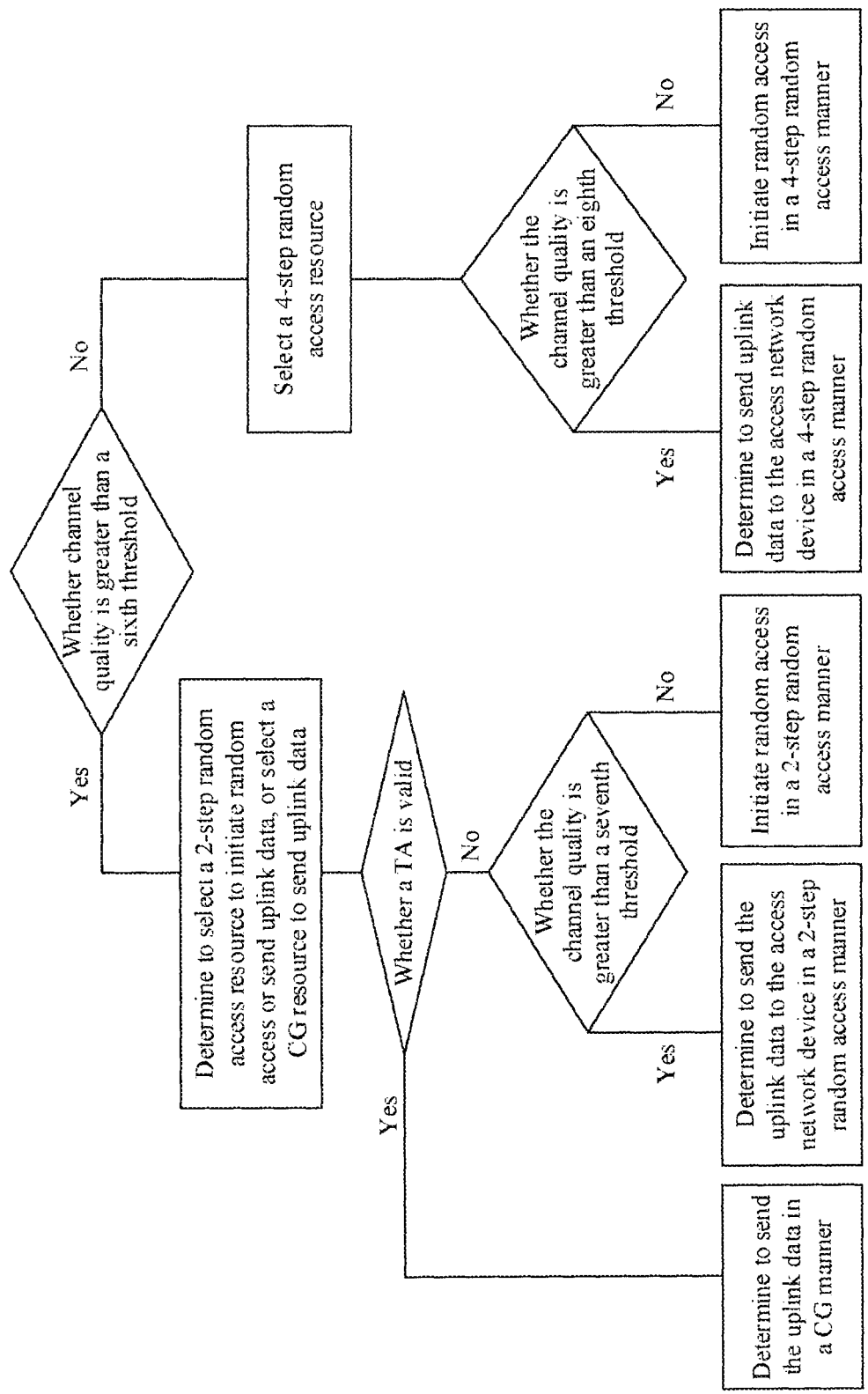
FIG. 7b is still another flowchart of a data transmission method according to an embodiment of this application.

With reference to FIG. 7b, the following describes in detail that the terminal selects, based on the sixth threshold, the eighth threshold, and the seventh threshold, an appropriate manner to send the uplink data in the method shown in FIG. 6 by using an example in which the terminal supports the CG and the access network device configures, for the terminal, a group of transmission resources corresponding to the 2-step random access manner.

The terminal obtains the quality of the channel between the terminal and the access network device, and compares the channel quality with the sixth threshold. When the channel quality is greater than the sixth threshold, the terminal determines to select the 2-step random access resource to initiate random access or send the uplink data, or select the CG resource to send the uplink data. When the channel quality is less than the sixth threshold, the terminal determines to select the 4-step random access resource to initiate random access or send the uplink data. For example, as shown in FIG. 7b, when the channel quality is greater than the sixth threshold, the terminal checks whether the IA is valid. If the TA is valid, the terminal determines to send the uplink data in the CG manner. If the TA is invalid, the terminal compares the channel quality with the seventh threshold. When the channel quality is greater than the seventh threshold, the terminal determines to send the uplink data in the 2-step random access manner, for example, sends MsgA based on the transmission resource corresponding to the 2-step random access manner, where MsgA includes the preamble and the PUSCH that carries the uplink data. Otherwise, when the channel quality is less than the seventh threshold, the terminal determines not to send the uplink data in the 2-step random access manner in the non-connected state, but to initiate random access in the 2-step random access manner, to access the cell.

As shown in FIG. 7b, after selecting to use the 4-step random access resource, the terminal compares the channel quality with the eighth threshold. When the channel quality is greater than the eighth threshold, the terminal determines to send the uplink data in the 4-step random access manner, for example, sends the uplink data by using Msg3 based on a transmission resource corresponding to the 4-step random access manner. Otherwise, when the channel quality is less than the eighth threshold, the terminal determines not to send the uplink data in the 4-step random access manner in the non-connected state, but to initiate random access in the 4-step random access manner, to access the cell.

For a process of sending the uplink data by the terminal in the CG manner, refer to the foregoing descriptions. Details are not described again.

Figure 7C:
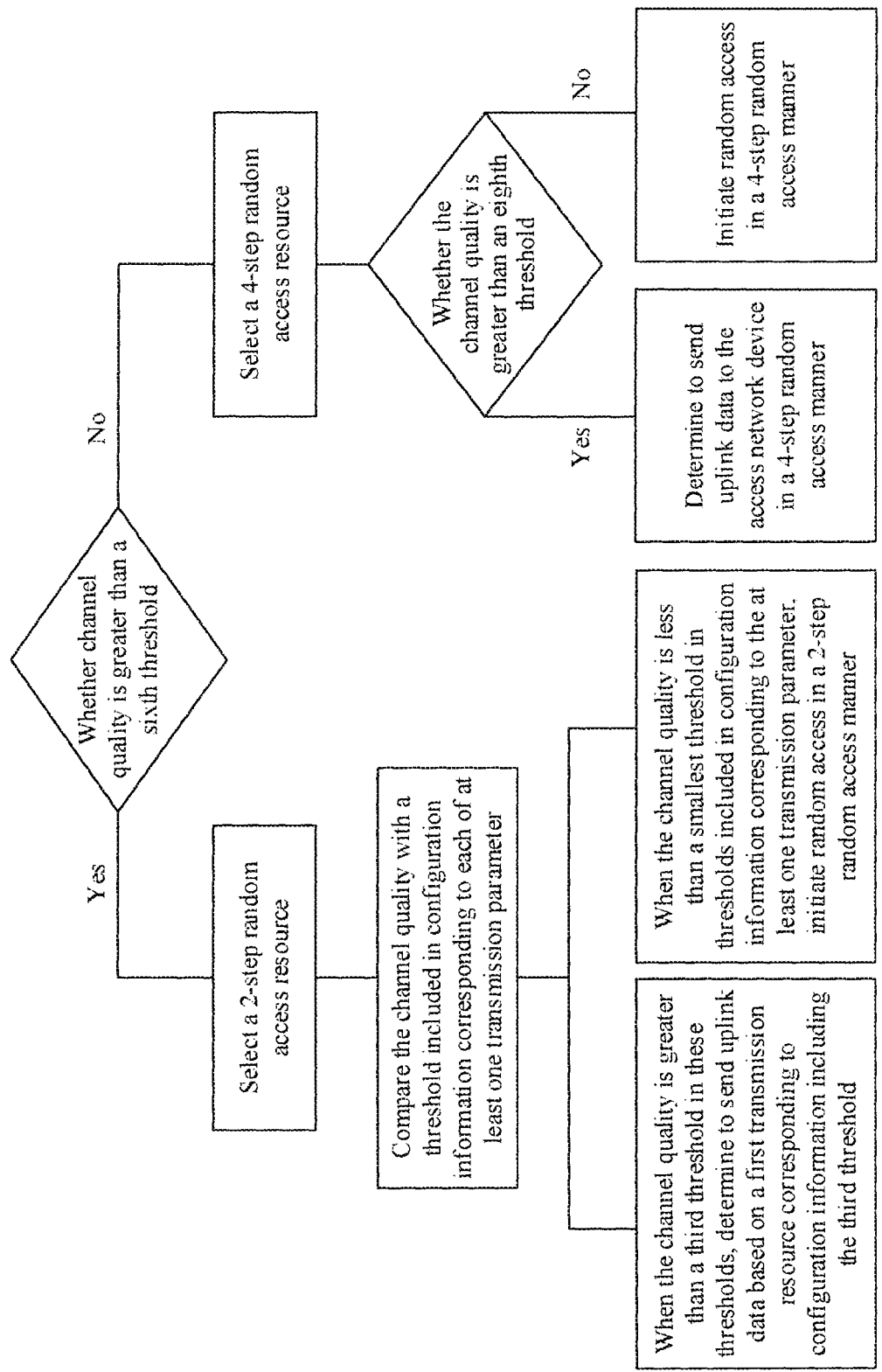
FIG. 7c is yet another flowchart of a data transmission method according to an embodiment of this application.

With reference to FIG. 7c, the following describes in detail that the terminal selects, based on the sixth threshold, the third threshold, and the eighth threshold, an appropriate manner to send the uplink data in the method shown in FIG. 6 by using an example in which the terminal does not support the CG, the access network device configures, for the terminal, a plurality of groups of transmission resources corresponding to the 2-step random access manner, and configuration information corresponding to the plurality of groups of transmission resources includes a threshold used by the terminal to determine whether to select the transmission resource. It should be noted that, for a data transmission manner in a case in which a plurality of groups of transmission resources correspond to transmission parameter ranges, a transmission parameter range corresponds to a threshold, or a plurality of groups of transmission resources correspond to transmission parameter thresholds, refer to FIG. 7c.

As shown in FIG. 7c, the terminal obtains the quality of the channel between the terminal and the access network device, and compares the channel quality with the sixth threshold. When the channel quality is greater than the sixth threshold, the terminal determines to select the 2-step random access resource to initiate random access or send the uplink data. When the channel quality is less than the sixth threshold, the terminal determines to select the 4-step random access resource to initiate random access or send the uplink data. For example, as shown in FIG. 7c, when the channel quality is greater than the sixth threshold, the terminal compares the channel quality with thresholds included in configuration information corresponding to each of at least one group of transmission parameters. When the channel quality is greater than a third threshold in these thresholds, the terminal determines to send MsgA based on a first transmission resource corresponding to configuration information including the third threshold, where MsgA includes the preamble and the PUSCH that carries the uplink data Otherwise, when the channel quality is less than a smallest threshold in the thresholds included in the configuration information corresponding to all the transmission parameters, the terminal determines not to send the uplink data in the 2-step random access manner in the non-connected state, but to initiate random access in the 2-step random access manner, to access the cell.

As shown in FIG. 7c, after selecting to use the 4-step random access resource, the terminal compares the channel quality with the eighth threshold. When the channel quality is greater than the eighth threshold, the terminal determines to send the uplink data in the 4-step random access manner, for example, sends the uplink data by using Msg3 based on a transmission resource corresponding to the 4-step random access manner. Otherwise, when the channel quality is less than the eighth threshold, the terminal determines not to send the uplink data in the 4-step random access manner in the non-connected state, but to initiate random access in the 4-step random access manner, to access the cell.

Specifically, for a manner of selecting the transmission resource by the terminal based on the third threshold, refer to the descriptions in FIG. 4. Details are not described again.

Figure 7D:
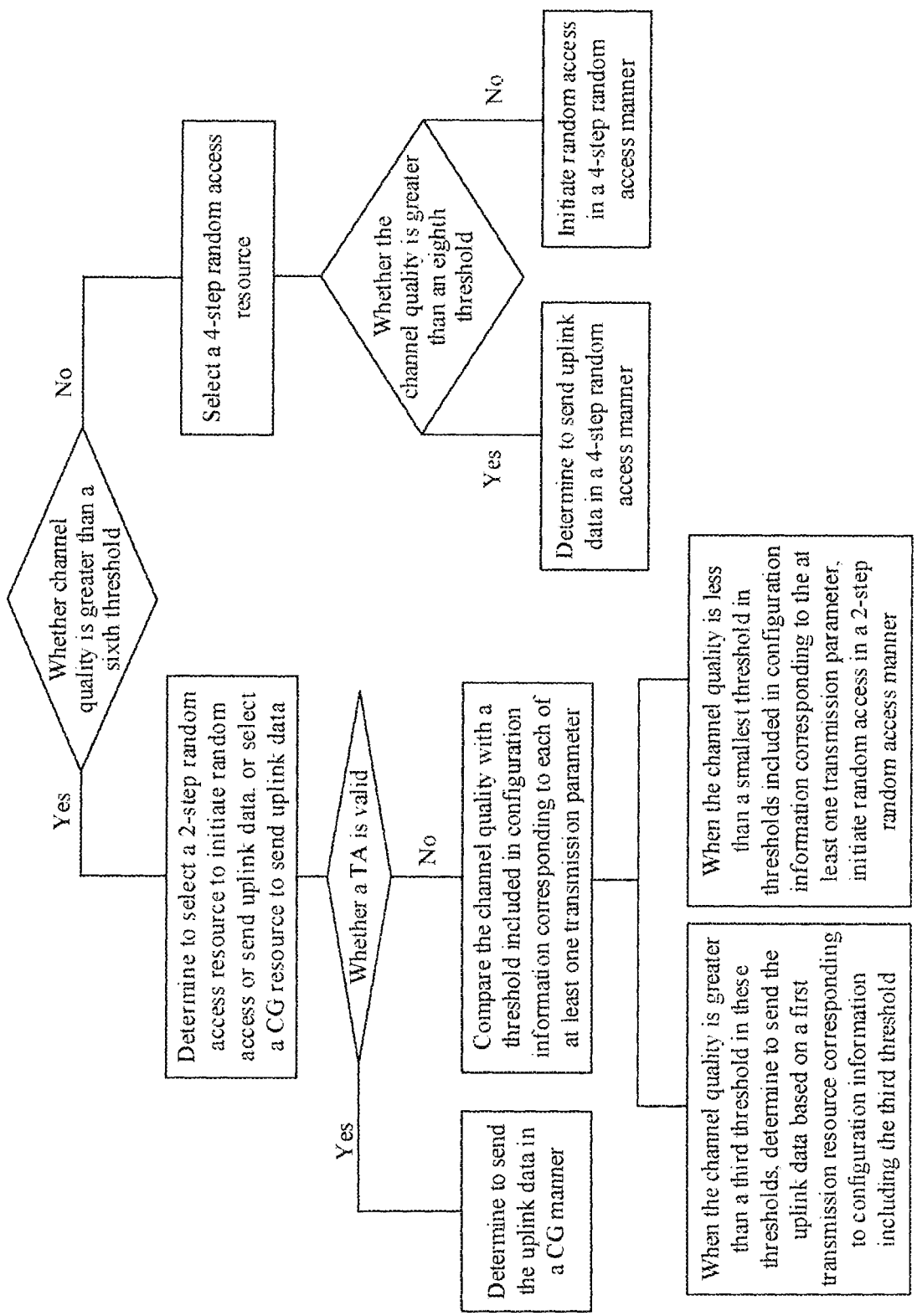
FIG. 7d is still yet another flowchart of a data transmission method according to an embodiment of this application.

With reference to FIG. 7d, the following describes in detail that the terminal selects, based on the sixth threshold, the third threshold, and the eighth threshold, an appropriate manner to send the uplink data in the method shown in FIG. 6 by using an example in which the terminal supports the CG, the access network device configures, for the terminal, a plurality of groups of transmission resources corresponding to the 2-step random access manner, and configuration information corresponding to the plurality of groups of transmission resources includes a threshold used by the terminal to determine whether to select the transmission resource. It should be noted that, for a data transmission manner in a case in which a plurality of groups of transmission resources correspond to transmission parameter ranges, a transmission parameter range corresponds to a threshold, or a plurality of groups of transmission resources correspond to transmission parameter thresholds, refer to FIG. 7d.

The terminal obtains the quality of the channel between the terminal and the access network device, and compares the channel quality with the sixth threshold. When the channel quality is greater than the sixth threshold, the terminal determines to select the 2-step random access resource to initiate random access or send the uplink data, or select the CG resource to send the uplink data. When the channel quality is less than the sixth threshold, the terminal determines to select the 4-step random access resource to initiate random access or send the uplink data. For example, as shown in FIG. 7d, when the channel quality is greater than the sixth threshold, the terminal checks whether the TA is valid. If the TA is valid, the terminal determines to send the uplink data in the CG manner. If the TA is invalid, the terminal compares the channel quality with thresholds included in configuration information corresponding to each of at least one group of transmission parameters. When the channel quality is greater than a third threshold in these thresholds, the terminal determines to send MsgA based on a first transmission resource corresponding to configuration information including the third threshold, where MsgA includes the preamble and the PUSCH that carries the uplink data. Otherwise, when the channel quality is less than a smallest threshold in the thresholds included in the configuration information corresponding to all the transmission parameters, the terminal determines not to send the uplink data in the 2-step random access manner in the non-connected state, but to initiate random access in the 2-step random access manner, to access the cell.

As shown in FIG. 7d, after selecting to use the 4-step random access resource, the terminal compares the channel quality with the eighth threshold. When the channel quality is greater than the eighth threshold, the terminal determines to send the uplink data in the 4-step random access manner, for example, sends the uplink data by using Msg3 based on a transmission resource corresponding to the 4-step random access manner. Otherwise, when the channel quality is less than the eighth threshold the terminal determines not to send the uplink data in the 4-step random access manner in the non-connected state, but to initiate random access in the 4-step random access manner, to access the cell.

For a process of sending the uplink data by the terminal in the CG manner, refer to the foregoing descriptions. Details are not described again.

The foregoing mainly describes the solutions provided in embodiments of this application from a perspective of interaction between nodes. It can be understood that, to implement the foregoing functions, nodes, for example, the terminal and the access network device, include corresponding hardware structures and/or software modules for performing the functions. A person of ordinary skill in the art should easily be aware that, in combination with the examples described in embodiments disclosed in this application, algorithm steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the terminal, the access network device and the like may be divided into functional modules based on the foregoing method examples. For example, each functional module may be obtained through division based on each function, or two or more functions may be integrated in one processing module. The integrated module may be implemented in a form of hardware, or may be implemented in a form of a software functional module. It should be noted that, in embodiments of this application, module division is an example, and is merely a logical function division. In actual implementation, another division manner may be used.

Figure 8:
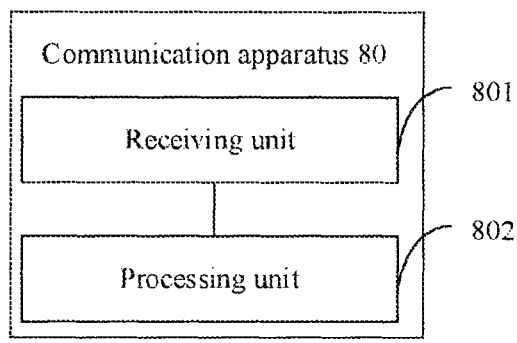
FIG. 8 is a schematic diagram of a composition of a communication apparatus 80 according to an embodiment of this application.

FIG. 8 is a diagram of a structure of a communication apparatus 80. The communication apparatus 80 may be a terminal, a chip in a terminal, or a system-on-a-chip. The communication apparatus 80 may be configured to perform functions of the terminal in the foregoing embodiments. In a feasible implementation, the communication apparatus 80 shown in FIG. 8 includes a receiving unit 801 and a processing unit 802.

In a possible design, the receiving unit 801 is configured to obtain quality of a channel between a terminal in a non-connected mode and an access network device. For example, the receiving unit 801 may support the communication apparatus 80 in performing step 401 and step 601.

The processing unit 802 is configured to: when the channel quality is greater than a first threshold, determine to send uplink data to the access network device in a random access manner or a CG manner, where the random access manner includes a 2-step random access manner or a 4-step random access manner; for example, when the channel quality is greater than a second threshold, determine to send the uplink data to the access network device in the 2-step random access manner; or when the channel quality is less than a second threshold, determine to send the uplink data to the access network device in the 4-step random access manner. For example, the processing unit 802 may support the communication apparatus 80 in performing step 402 and step 403.

In another possible design, the receiving unit 801 is configured to obtain quality of a channel between a terminal and an access network device. For example, the receiving unit 801 may support the communication apparatus 80 in performing step 401 and step 601.

The processing unit 802 is configured to: when the channel quality is greater than a sixth threshold and the channel quality is greater than a seventh threshold, determine to send uplink data to the access network device in a 2-step random access manner; or when the channel quality is less than a sixth threshold and the channel quality is greater than an eighth threshold, determine to send uplink data to the access network device in a 4-step random access manner. For example, the processing unit 802 may support the communication apparatus 80 in performing step 602 and step 603.

Specifically, all related content of the steps in the foregoing method embodiments shown in FIG. 4 to FIG. 7d may be cited in function descriptions of the corresponding functional modules. Details are not described herein again. The communication apparatus 80 is configured to perform functions of the terminal in the data transmission methods shown in the methods shown in FIG. 4 to FIG. 7d, and therefore can achieve a same effect as the foregoing data transmission methods.

In another implementation, the communication apparatus 80 shown in FIG. 8 includes a processing module and a communication module. The processing module is configured to control and manage an action of the communication apparatus 80. For example, the processing module may integrate a function of the processing unit 802, and may be configured to support the communication apparatus 80 in performing step 401, step 601, step 602, step 603, and another process of the technology described in this specification. The communication module may integrate a function of the receiving unit 801, and may be configured to support the communication apparatus 80 in performing communicating with another network entity, for example, communicating with a functional module or a network entity shown in FIG. 2. The communication apparatus 80 may further include a storage module, to store program code and data of the communication apparatus 80.

The processing module may be a processor or a controller. The processor may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor. The communication module may be a transceiver circuit, a communication interface, or the like. The storage module may be a memory. When the processing module is the processor, the communication module is the communication interface, and the storage module is the memory, the communication apparatus 80 in embodiments of this application may be the communication apparatus shown in FIG. 3.

Figure 9:
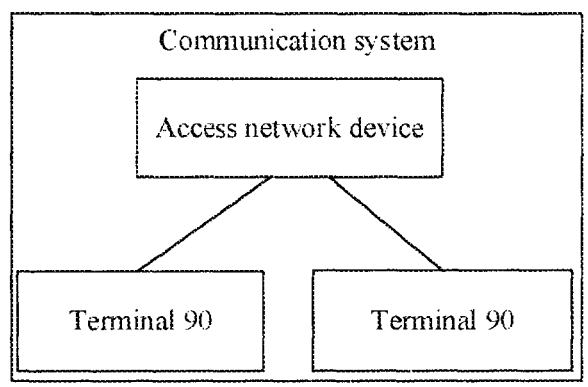
FIG. 9 is a schematic diagram of a composition of a communication system according to an embodiment of this application.

FIG. 9 is a diagram of a structure of a communication system according to an embodiment of this application. As shown in FIG. 9, the communication system may include a terminal 90 and may further include an access network device. A function of the terminal 90 is the same as a function of the communication apparatus 80.

In an example, the terminal 90 is configured to: obtain quality of a channel between the terminal 90 in a non-connected state and the access network device; and when the channel quality is greater than a first threshold, determine to send uplink data to the access network device in a random access manner or a CG manner, where the random access manner includes a 2-step random access manner or a 4-step random access manner; for example, when the channel quality is greater than a second threshold, determine to send the uplink data to the access network device in the 2-step random access manner; or when the channel quality is less than a second threshold, determine to send the uplink data to the access network device in the 4-step random access manner.

In another example, the terminal 90 is configured to: obtain quality of a channel between the terminal 90 and the access network device; and when the channel quality is greater than a sixth threshold and the channel quality is greater than a seventh threshold, determine to send uplink data to the access network device in a 2-step random access manner; or when the channel quality is less than a sixth threshold and the channel quality is greater than an eighth threshold, determine to send uplink data to the access network device in a 4-step random access manner.

For specific execution actions of the terminal 90, refer to related actions of the terminal in the methods shown in FIG. 4 to FIG. 7*d*. Details are not described again.

An embodiment of this application further provides a computer-readable storage medium. All or some of the processes in the foregoing method embodiments may be implemented by a computer program instructing related hardware. The program may be stored in the computer-readable storage medium. When the program is executed, the processes of the foregoing method embodiments may be included. The computer-readable storage medium may be an internal storage unit of the terminal, for example, including a data transmit end and/or a data receive end, in any one of the foregoing embodiments, for example, a hard disk drive or a memory of the terminal. Alternatively, the computer-readable storage medium may be an external storage device of the terminal, for example, a plug-in hard disk, a smart media card (smart media card, SMC), a secure digital (secure digital, SD) card, a flash card (flash card), or the like that are configured on the terminal. Further, the computer-readable storage medium may alternatively include both of the internal storage unit of the terminal and the external storage device. The computer-readable storage medium is configured to store the computer program and other programs and data that are required by the terminal. The computer-readable storage medium may be further configured to temporarily store data that has been output or is to be output.

With reference to the foregoing descriptions, this application further provides the following embodiments.

Embodiment 1: A data transmission method is provided. The method includes:

A terminal obtains quality of a channel between the terminal and an access network device, where the terminal is in a non-connected state; and
when the channel quality is greater than a first threshold, the terminal determines to send uplink data to the access network device in a random access manner or a configured grant CG manner, where the random access manner includes a 2-step random access manner or a 4-step random access manner.

That the terminal determines to send uplink data to the access network device in a random access manner includes:
when the channel quality is greater than a second threshold, the terminal determines to send the uplink data to the access network device in the 2-step random access manner; or
when the channel quality is less than a second threshold, the terminal determines to send the uplink data to the access network device in the 4-step random access manner.

Embodiment 2: According to the method in Embodiment 1, after the terminal determines to send the uplink data to the access network device in the 2-step random access manner, the method further includes:

When the channel quality is greater than a third threshold, the terminal sends the uplink data to the access network device on MsgA based on a first transmission resource corresponding to the 2-step random access manner.

Embodiment 3: According to the method in Embodiment 2, configuration information corresponding to the first transmission resource includes the third threshold; or
the third threshold is included in at least one threshold; each of the at least one threshold corresponds to one transmission parameter threshold, and a transmission parameter of the first transmission resource is greater than a transmission parameter threshold corresponding to the third threshold; or
the third threshold is included in at least one threshold, each of the at least one threshold corresponds to one transmission parameter range, and a transmission parameter of the first transmission resource belongs to a transmission parameter range corresponding to the third, threshold.

Embodiment 4: According to the method in any one of Embodiments 1 to 3, that the terminal determines to send uplink data to the access network device in a random access manner or a configured grant CG manner includes:

The terminal determines whether a timing advance TA is valid, where the TA is used for uplink time synchronization between the terminal and the access network device; and
when the TA is invalid, the terminal determines to send the uplink data to the access network device in the random access manner; or
when the TA is valid, the terminal determines to send the uplink data to the access network device in the CG manner, where a CG resource corresponding to the CG manner is a physical uplink shared channel PUSCH resource that is preconfigured by the access network device and that is used for transmission by the terminal in the non-connected state.

Embodiment 5: According to the method in any one of Embodiments 1 to 4, after the terminal determines to send the uplink data to the access network device in the CG manner, the method further includes:

When the channel quality is greater than a fourth threshold, the terminal sends the uplink data to the access network device based on a first CG resource.

Embodiment 6: According to the method in Embodiment 5, configuration information corresponding to the first CG resource includes the fourth threshold; or
  the fourth threshold is included in at least one threshold, each of the at least one threshold corresponds to one transmission parameter threshold, and a transmission parameter of the first CG resource is greater than a transmission parameter threshold corresponding to the fourth threshold; or
  the fourth threshold is included in at least one threshold, each of the at least one threshold corresponds to one transmission parameter range, and a transmission parameter of the first CG resource belongs to a transmission parameter range corresponding to the fourth threshold.

Embodiment 7: According to the method in Embodiment 3 or 6, the transmission parameter includes one or more of a modulation and coding scheme MCS and a transport block speed TBS.

Embodiment 8: According to the method in any one of Embodiments 4 to 7, the TA being invalid includes one or more of the following: a validity period of the TA expires;
  a distance between a current location of the terminal and a location at which the terminal is located when the TA is started is greater than a distance threshold; and
  a difference between the channel quality and quality of the channel between the terminal and the access network device achieved when the TA is started is greater than a channel quality change threshold.

Embodiment 9: According to the method in any one of Embodiments 1 to 8, the method further includes:

When the channel quality is less than the first threshold and the channel quality is greater than a fifth threshold; the terminal determines not to send the uplink data to the access network device in the non-connected state, but to access a cell in the 2-step random access manner; or
  when the channel quality is less than the first threshold and the channel quality is less than a fifth threshold, the terminal determines not to send the uplink data to the access network device in the non-connected state, but to access a cell in the 4-step random access manner.

Embodiment 10: According to the method in any one of Embodiments 1 to 9, the first threshold, the second threshold, and the third threshold are configured by the access network device for the terminal.

Embodiment 11: A data transmission method is provided. The method includes:

A terminal obtains quality of a channel between the terminal and an access network device, where the terminal is in a non-connected state; and
  when the channel quality is greater than a sixth threshold and the channel quality is greater than a seventh threshold, the terminal determines to send uplink data to the access network device in a 2-step random access manner; or
  when the channel quality is less than a sixth threshold and the channel quality is greater than an eighth threshold, the terminal determines to send uplink data to the access network device in a 4-step random access manner.

Embodiment 12: According to the method in Embodiment 11, that the terminal determines to send uplink data to the access network device in a 2-step random access manner includes:

The terminal determines whether a timing advance TA is valid, where the TA is used for uplink time synchronization between the terminal and the access network device; and
  when the TA is invalid, the terminal determines to send the uplink data to the access network device in the 2-step random access manner.

Embodiment 13: According to the method in Embodiment 12, the method further includes:

When the TA is valid, the terminal determines to send the uplink data to the access network device in a CG manner, where a CG resource corresponding to the CG manner is a physical uplink shared channel PUSCH resource that is preconfigured by the access network device and that is used for transmission by the terminal in the non-connected state.

Embodiment 14. According to the method in any one of Embodiments 11 to 13, after the terminal determines to send the uplink data to the access network device in the 2-step random access manner, the method further includes:

When the channel quality is greater than a third threshold, the terminal sends the uplink data to the access network device on MsgA based on a first transmission resource corresponding to the 2-step random access manner.

Embodiment 15: According to the method in Embodiment 14, configuration information corresponding to the first transmission resource includes the third threshold; or
  the third threshold is included in at least one threshold, each of the at least one threshold corresponds to one transmission parameter threshold, and a transmission parameter of the first transmission resource is greater than a transmission parameter threshold corresponding to the third threshold; or
  the third threshold is included in at least one threshold; each of the at least one threshold corresponds to one transmission parameter range, and a transmission parameter of the first transmission resource belongs to a transmission parameter range corresponding to the third threshold.

Embodiment 16: According to the method in any one of Embodiments 13 to 15, after the terminal determines to send the uplink data to the access network device in the CG manner; the method further includes:

When the channel quality is greater than a fourth threshold, the terminal sends the uplink data to the access network device based on a first CG resource.

Embodiment 17: According to the method in Embodiment 16, configuration information corresponding to the first CG resource includes the fourth threshold; or
  the fourth threshold is included in at least one threshold, each of the at least one threshold corresponds to one transmission parameter threshold, and a transmission parameter of the first CG resource is greater than a transmission parameter threshold corresponding to the fourth threshold; or
  the fourth threshold is included in at least one threshold, each of the at least one threshold corresponds to one transmission parameter range, and a transmission parameter of the first CG resource belongs to a transmission parameter range corresponding to the fourth threshold.

Embodiment 18: According to the method in Embodiment 15 or 17, the transmission parameter includes one or more of a modulation and coding scheme MCS and a transport block speed TBS.

Embodiment 19: According to the method in any one of Embodiments 12 to 18, the TA being invalid includes one or more of the following: a validity period of the TA expires;
- a distance between a current location of the terminal and a location at Which the terminal is located when the TA is started is greater than a distance threshold; and
- a difference between the channel quality and quality of the channel between the terminal and the access network device achieved when the TA is started is greater than a channel quality change threshold.

Embodiment 20: According to the method in any one of Embodiments 11 to 19, the method further includes:

When the channel quality is greater than the sixth threshold and the channel quality is less than the seventh threshold, the terminal determines not to send the uplink data to the access network device in the non-connected state, but to access a cell in the 2-step random access manner; or
- when the channel quality is less than the sixth threshold and the channel quality is less than an eighth threshold, the terminal determines not to send the uplink data to the access network device in the non-connected state, but to access a cell in the 4-step random access manner.

Embodiment 21: According to the method in any one of Embodiments 11 to 20, the sixth threshold, the seventh threshold, and the eighth threshold are configured by the access network device for the terminal.

Embodiment 22: A communication apparatus is provided. The communication apparatus includes:
- a receiving unit, configured to obtain quality of a channel between a terminal and an access network device, where the terminal is in a non-connected state; and
- a processing unit, configured to: when the channel quality is greater than a first threshold, determine to send uplink data to the access network device in a random access manner or a configured grant CG manner, where the random access manner includes a 2-step random access manner or a 4-step random access manner.

That a processing unit is configured to determine to send uplink data to the access network device in a random access manner includes:
- when the channel quality is greater than a second threshold, determining to send the uplink data to the access network device in the 2-step random access manner; or
- when the channel quality is less than a second threshold, determining to send the uplink data to the access network device in the 4-step random access manner.

Embodiment 23: According to the communication apparatus in Embodiment 22, after determining to send the uplink data to the access network device in the 2-step random access manner, the processing unit is further configured to:
- when the channel quality is greater than a third threshold, send the uplink data to the access network device on MsgA based on a first transmission resource corresponding to the 2-step random access manner.

Embodiment 24: According to the communication apparatus in Embodiment 23, configuration information corresponding to the first transmission resource includes the third threshold; or
- the third threshold is included in at least one threshold, each of the at least one threshold corresponds to one transmission parameter threshold, and a transmission parameter of the first transmission resource is greater than a transmission parameter threshold corresponding to the third threshold; or
- the third threshold is included in at least one threshold, each of the at least one threshold corresponds to one transmission parameter range, and a transmission parameter of the first transmission resource belongs to a transmission parameter range corresponding to the third threshold.

Embodiment 25: According to the communication apparatus in any one of Embodiments 22 to 24, that the processing unit determines to send uplink data to the access network device in a random access manner or a configured grant CG manner includes:
- determining whether a timing advance TA is valid, where the TA is used for uplink time synchronization between the terminal and the access network device; and when the TA is invalid, determining to send the uplink data to the access network device in the random access manner; or
- when the TA is valid, determining to send the uplink data to the access network device in the CG manner, where a CG resource corresponding to the CG manner is a physical uplink shared channel PUSCH resource that is preconfigured by the access network device and that is used for transmission by the terminal in the non-connected state.

Embodiment 26: According to the communication apparatus in any one of Embodiments 22 to 25, after determining to send the uplink data to the access network device in the CG manner, the processing unit is further configured to:
- when the channel quality is greater than a fourth threshold, send the uplink data to the access network device based on a first CG resource.

Embodiment 27: According to the communication apparatus in Embodiment 26, configuration information corresponding to the first CG resource includes the fourth threshold; or
- the fourth threshold is included in at least one threshold, each of the at least one threshold corresponds to one transmission parameter threshold, and a transmission parameter of the first CG resource is greater than a transmission parameter threshold corresponding to the fourth threshold; or
- the fourth threshold is included in at least one threshold, each of the at least one threshold corresponds to one transmission parameter range, and a transmission parameter of the first CG resource belongs to a transmission parameter range corresponding to the fourth threshold.

Embodiment 28: According to the communication apparatus in Embodiment 24 or 27, the transmission parameter includes one or more of a modulation and coding scheme MCS and a transport block speed TBS.

Embodiment 29: According to the communication apparatus in any one of Embodiments 25 to 28, the TA being invalid includes one or more of the following: a validity period of the TA expires;
- a distance between a current location of the terminal and a location at which the terminal is located when the TA is started is greater than a distance threshold; and
- a difference between the channel quality and quality of the channel between the terminal and the access network device achieved when the TA is started is greater than a channel quality change threshold.

Embodiment 30: According to the communication apparatus in any one of Embodiments 22 to 29, the processing unit is further configured to:
- when the channel quality is less than the first threshold and the channel quality is greater than a fifth threshold, determine not to send the uplink data to the access network device in the non-connected state, but to access a cell in the 2-step random access manner; and when the channel quality is less than the first threshold and the channel quality is less than the fifth threshold, determine not to send the uplink data to the access network device in the non-connected state, but to access a cell in the 4-step random access manner.

Embodiment 31: According to the communication apparatus in any one of Embodiments 22 to 30, the first threshold, the second threshold, and the third threshold are configured by the access network device for the terminal.

Embodiment 32: A communication apparatus is provided. The apparatus includes:
 a receiving unit, configured to obtain quality of a channel between a terminal and an access network device, where the terminal is in a non-connected state; and
 a processing unit, configured to: when the channel quality is greater than a sixth threshold and the channel quality is greater than a seventh threshold, determine to send uplink data to the access network device in a 2-step random access manner; or
 when the channel quality is less than a sixth threshold and the channel quality is greater than an eighth threshold, determine to send uplink data to the access network device in a 4-step random access manner.

Embodiment 33: According to the communication apparatus in Embodiment 32, the processing unit is specifically configured to:
 determine whether a timing advance TA is valid, where the TA is used for uplink time synchronization between the terminal and the access network device; and when the TA is invalid, determine to send the uplink data to the access network device in the 2-step random access manner.

Embodiment 34: According to the communication apparatus in Embodiment 33, the processing unit is further configured to:
 when the TA is valid, determine to send the uplink data to the access network device in a CG manner, where a CG resource corresponding to the CG manner is a physical uplink shared channel PUSCH resource that is preconfigured by the access network device and that is used for transmission by the terminal in the non-connected state.

Embodiment 35: According to the communication apparatus in any one of Embodiments 32 to 34, where after determining to send the uplink data to the access network device in the 2-step random access manner, the processing unit is further configured to:
 when the channel quality is greater than a third threshold, send the uplink data to the access network device on MsgA based on a first transmission resource corresponding to the 2-step random access manner.

Embodiment 36: According to the communication apparatus in Embodiment 35, configuration information corresponding to the first transmission resource includes the third threshold; or
 the third threshold is included in at least one threshold, each of the at least one threshold corresponds to one transmission parameter threshold, and a transmission parameter of the first transmission resource is greater than a transmission parameter threshold corresponding to the third threshold; or
 the third threshold is included in at least one threshold, each of the at least one threshold corresponds to one transmission parameter range, and a transmission parameter of the first transmission resource belongs to a transmission parameter range corresponding to the third threshold.

Embodiment 37: According to the communication apparatus in any one of Embodiments 34 to 36, after determining to send the uplink data to the access network device in the CG manner, the processing unit is further configured to:
 when the channel quality is greater than a fourth threshold, send the uplink data to the access network device based on a first CG resource.

Embodiment 38: According to the communication apparatus in Embodiment 37, configuration information corresponding to the first CG resource includes the fourth threshold; or
 the fourth threshold is included in at least one threshold, each of the at least one threshold corresponds to one transmission parameter threshold, and a transmission parameter of the first CG resource is greater than a transmission parameter threshold corresponding to the fourth threshold; or
 the fourth threshold is included in at least one threshold, each of the at least one threshold corresponds to one transmission parameter range, and a transmission parameter of the first CG resource belongs to a transmission parameter range corresponding to the fourth threshold.

Embodiment 39: According to the communication apparatus in Embodiment 36 or 38, the transmission parameter includes one or more of a modulation and coding scheme MCS and a transport block speed TBS.

Embodiment 40: According to the communication apparatus in any one of Embodiments 33 to 39, the TA being invalid includes one or more of the following: a validity period of the TA expires;
 a distance between a current location of the terminal and a location at which the terminal is located when the TA is started is greater than a distance threshold; and
 a difference between the channel quality and quality of the channel between the terminal and the access network device achieved when the TA is started is greater than a channel quality change threshold.

Embodiment 41: According to the communication apparatus in any one of Embodiments 32 to 40, the processing unit is further configured to:
 when the channel quality is greater than the sixth threshold and the channel quality is less than the seventh threshold, determine not to send the uplink data to the access network device in the non-connected state, but to access a cell in the 2-step random access manner; or
 when the channel quality is less than the sixth threshold and the channel quality is less than an eighth threshold, determine not to send the uplink data to the access network device in the non-connected state, but to access a cell in the 4-step random access manner.

Embodiment 42: According to the communication apparatus in any one of Embodiments 32 to 41, the sixth threshold, the seventh threshold, and the eighth threshold are configured by the access network device for the terminal.

Embodiment 43: A communication system is provided. The communication system includes:
 a terminal, configured to obtain quality of a channel between the terminal and an access network device, where the terminal is in a non-connected state.

When the channel quality is greater than a first threshold the terminal determines to send uplink data to the access network device in a random access manner or a configured grant CG manner, where the random access manner includes a 2-step random access manner or a 4-step random access manner.

That the terminal determines to send uplink data to the access network device in a random access manner includes:

When the channel quality is greater than a second threshold, the terminal determines to send the uplink data to the access network device in the 2-step random access manner; or when the channel quality is less than a second threshold, the terminal determines to send the uplink data to the access network device in the 4-step random access manner.

Embodiment 44: A communication system is provided. The communication system includes:

a terminal, configured to obtain quality of a channel between the terminal and an access network device, where the terminal is in a non-connected state.

When the channel quality is greater than a sixth threshold and the channel quality is greater than a seventh threshold, the terminal determines to send uplink data to the access network device in a 2-step random access manner; or when the channel quality is less than a sixth threshold and the channel quality is greater than an eighth threshold, the terminal determines to send uplink data to the access network device in a 4-step random access manner.

Embodiment 45: A communication apparatus is provided. The communication apparatus includes one or more processors and a communication interface, and the one or more processors and the communication interface are configured to support the communication apparatus in performing the data transmission method according to any one of Embodiments 1 to or the data transmission method according to any one of Embodiments 11 to 21.

Embodiment 46: A computer-readable storage medium is provided. The computer-readable storage medium includes computer instructions, and when the computer instructions are run on a computer, the computer is enabled to perform the data transmission method according to any one of Embodiments 1 to 10 or the data transmission method according to any one of Embodiments 11 to 21.

It should be noted that, in the specification, claims, and accompanying drawings of this application, the terms "first", "second", and the like are intended to distinguish between different objects but do not indicate a particular order. In addition, the terms "including" and "having" and any other variants thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

It should be understood that, in this application, "at least one (item)" means one or more, "a plurality of" means two or more, "at least two (items)" means two, three, or more, and "and/or" is used to describe an association relationship between associated objects, and indicates that there may be three relationships. For example. "A and/or B" may indicate that only A exists, only B exists, and both A and B exist, where A and B may be singular or plural. The character "/" generally indicates an "or" relationship between the associated objects. "At least one of the following items (pieces)" or a similar expression thereof refers to any combination of these items, including any combination of singular items (pieces) or plural items (pieces). For example, at least one of a, b, or c may indicate a, b, c, a and b, a and c, b and c, or a, b, and c, where a, b, and c may be singular or plural.

It should be understood that in embodiments of this application, "B corresponding to A" indicates that B is associated with A. For example, B may be determined based on A. It should be further understood that determining B based on A does not mean that B is determined based only on A. B may alternatively be determined based on A and/or other information. In addition, in embodiments of this application, "connection" means various connection manners such as a direct connection or an indirect connection, for implementing communication between devices. This is not limited in embodiments of this application.

In embodiments of this application, unless otherwise specified, "transmission" (transmit/transmission) refers to bidirectional transmission, and includes a sending action and/or a receiving action. Specifically, "transmission" in embodiments of this application includes data sending, data receiving, or data sending and data receiving. In other words, data transmission herein includes uplink data transmission and/or downlink data transmission. Data may include a channel and/or a signal. The uplink data transmission is uplink channel transmission and/or uplink signal transmission, and the downlink data transmission is downlink channel transmission and/or downlink signal transmission. In embodiments of this application, a "network" and a "system" express a same concept, and a communication system is a communication network.

The foregoing descriptions about implementations allow a person skilled in the art to clearly understand that, for the purpose of convenient and brief description, division of the foregoing functional modules is used as an example for illustration. In actual application, the foregoing functions can be allocated to different functional modules for implementation based on a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, the module or division into the units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate. Parts displayed as units may be one or more physical units, to be specific, may be located in one place, or may be distributed at a plurality of different places. Some or all of the units may be selected based on actual requirements to achieve the objectives of the solutions of embodiments.

In addition, functional units in embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of a software functional unit and sold or used as an independent product, the integrated unit may be stored in a readable storage medium. Based on such an understanding, the technical solutions of embodiments of this application essentially, or the part contributing to the current technology, or all or some of the technical solutions may be implemented in a form of a software product. The software product is stored in a storage medium and includes several instructions for instructing a device, where for example, the device may be a single-chip microcomputer or a chip, or a processor (processor) to perform all or some of the steps of the methods in embodiments of this application. The foregoing storage medium includes any medium that can store program code, such as a USB flash drive, a removable hard disk, a ROM, a RAM, a magnetic disk, or an optical disc.

What is claimed is:

1. A method implemented by a terminal, wherein the method comprises:
   obtaining a first channel quality of a channel between the terminal and an access network device, wherein the terminal is in a non-connected state;
   sending uplink data to the access network device in a random access manner or a configured grant (CG) manner when the first channel quality is greater than a first threshold by:
   sending the uplink data to the access network device in the CG manner and using a CG resource when a timing advance (TA) for uplink time synchronization between the terminal and the access network device is valid, wherein a CG resource is a preconfigured physical uplink shared channel (PUSCH) resource and is for transmission by the terminal in the non-connected state;
   sending the uplink data to the access network device in a 2-step random access manner when the TA is invalid and when the first channel quality is greater than a second threshold; and
   sending the uplink data to the access network device in a 4-step random access manner when the TA is invalid and when the first channel quality is less than the second threshold;
   skipping transmission of the uplink data in the random access manner in the non-connected state and thereafter initiating the 2-step random access manner to access a cell when the first channel quality is less than the first threshold and is greater than a third threshold; and
   skipping transmission of the uplink data in the random access manner in the non-connected state and thereafter initiating the 4-step random access manner to access the cell when the first channel quality is less than the first threshold and is less than the third threshold.

2. The method of claim 1, further comprising sending the uplink data to the access network device in the random access manner when the TA is invalid.

3. The method of claim 2, wherein the TA being invalid comprises a validity period of the TA expiring.

4. The method of claim 3, wherein a validity period of the TA is based on a timer started upon receiving a validity period value from the access network device.

5. The method of claim 2, wherein the TA being invalid comprises a distance between a current location of the terminal and a location at which the terminal is located when the TA is started being greater than a distance threshold.

6. The method of claim 2, wherein the TA is invalid when a difference between the first channel quality and a second channel quality of the channel at which the TA was started exceeds a channel quality change threshold.

7. The method of claim 1, wherein sending the uplink data to the access network device in the CG manner, the method further comprises sending the uplink data to the access network device based on a first CG resource when the first channel quality is greater than a third threshold, and wherein configuration information corresponding to the first CG resource comprises the third threshold.

8. The method of claim 1, wherein a quantity of bits of the uplink data is less than or equal to a preset value.

9. The method of claim 1, wherein the first threshold is preconfigured.

10. A method implemented by an access network device, wherein the method comprises:
    configuring a first threshold for a terminal, wherein the terminal is in a non-connected state, and wherein the first threshold enables the terminal to determine whether to send uplink data to the access network device;
    receiving the uplink data in a random access manner or in a configured grant (CG) manner when a channel quality of a channel between the terminal and the access network device is greater than the first threshold;
    receiving the uplink data in the CG manner when a CG resource is configured for the terminal and a timing advance (TA) is valid, wherein the CG resource is a preconfigured physical uplink shared channel (PUSCH) resource;
    receiving the uplink data in a 2-step random access manner when the TA is invalid and when the channel quality is greater than a second threshold;
    receiving the uplink data in a 4-step random access manner when the TA is invalid and when the channel quality is less than the second threshold;
    avoiding receiving the uplink data in the random access manner in the non-connected state and thereafter initiating the 2-step random access manner to access a cell when the first channel quality is less than the first threshold and is greater than a third threshold; and
    avoiding receiving the uplink data in the random access manner in the non-connected state and thereafter initiating the 4-step random access manner to access the cell when the first channel quality is less than the first threshold and is less than the third threshold.

11. The method of claim 10, further comprising receiving the uplink data in the 2-step random access manner when the channel quality is greater than a second threshold and when a distance between a current location of the terminal and a previous location of the terminal at which the TA was started exceeds a distance threshold.

12. The method of claim 10, further comprising configuring the second threshold for the terminal.

13. A communication apparatus comprising:
    a memory configured to store instructions; and
    a processor coupled to the memory and configured to execute the instructions to cause the communication apparatus to:
    obtain a first channel quality of a channel between the terminal and an access network device, wherein the terminal is in a non-connected state;
    send uplink data to the access network device in a random access manner or a configured grant (CG) manner when the first channel quality is greater than a first threshold by:
    sending the uplink data to the access network device in the CG manner and using a CG resource when a timing advance (TA) for uplink time synchronization between the terminal and the access network device is valid, wherein a CG resource is a preconfigured physical uplink shared channel (PUSCH) resource and is for transmission by the terminal in the non-connected state;

sending the uplink data to the access network device in a 2-step random access manner when the TA is invalid and when the first channel quality is greater than a second threshold; and sending the uplink data to the access network device in a 4-step random access manner when the TA is invalid and when the first channel quality is less than the second threshold;

skip transmission of the uplink data in the random access manner in the non-connected state and thereafter initiate the 2-step random access manner to access a cell when the first channel quality is less than the first threshold and is greater than a third threshold; and skip transmission of the uplink data in the random access manner in the non-connected state and thereafter initiate the 4-step random access manner to access the cell when the first channel quality is less than the first threshold and is less than the third threshold.

14. The communication apparatus of claim 13, wherein the processor is further configured to execute the instructions to cause the communication apparatus to determine to send the uplink data to the access network device in the random access manner when the TA is invalid.

15. The communication apparatus of claim 14, wherein the TA being invalid comprises one or more of the following: a validity period of the TA expiring; a distance between a current location of the terminal and a location at which the terminal is located when the TA is started being greater than a distance threshold; or a difference between the first channel quality and a second channel quality of the channel between the terminal and the access network device achieved when the TA is started being greater than a channel quality change threshold.

16. The communication apparatus of claim 13, wherein after determining to send the uplink data to the access network device in the CG manner, the processor is further configured to execute the instructions to cause the communication apparatus to send the uplink data to the access network device based on a first CG resource when the first channel quality is greater than a third threshold, and wherein configuration information corresponding to the first CG resource comprises the third threshold.

17. The communication apparatus of claim 13, wherein the first threshold is preconfigured.

18. The communication apparatus of claim 13, wherein a quantity of bits of the uplink data is less than or equal to a preset value.

19. The communication apparatus of claim 13, wherein the first threshold is preconfigured by a system information block (SIB) for the terminal.

* * * * *